United States Patent
Xu et al.

(10) Patent No.: US 11,711,133 B2
(45) Date of Patent: Jul. 25, 2023

(54) ELECTRONIC DEVICE, WIRELESS COMMUNICATION METHOD AND COMPUTER READABLE STORAGE MEDIUM RELATED TO TRANSMISSION CONFIGURATION INDICATION (TCI) STATE

(71) Applicant: Sony Group Corporation, Tokyo (JP)

(72) Inventors: Jin Xu, Beijing (CN); Dongru Li, Beijing (CN); Wenjing Ren, Beijing (CN); Hang Yang, Beijing (CN); Xiaofeng Tao, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/741,450

(22) Filed: May 11, 2022

(65) Prior Publication Data
US 2022/0278732 A1    Sep. 1, 2022

Related U.S. Application Data

(63) Continuation of application No. 16/646,153, filed as application No. PCT/CN2019/070379 on Jan. 4, 2019, now abandoned.

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC .. H04B 7/0695; H04B 7/0617; H04B 7/0626; H04B 7/086; H04B 7/0619; H04B 7/088;
(Continued)

(56) References Cited

U.S. PATENT DOCUMENTS

2013/0072243 A1* 3/2013 Yu ................. H04B 7/0665
455/509
2017/0105112 A1    4/2017 Park et al.
(Continued)

FOREIGN PATENT DOCUMENTS

CN    103918196 A    7/2014
CN    104782056 A    7/2015
(Continued)

OTHER PUBLICATIONS

U.S. Appl. No. 62/615,715, filed Jan. 10, 2018 (Year: 2018).*
(Continued)

*Primary Examiner* — Ian N Moore
*Assistant Examiner* — Sun Jong Kim
(74) *Attorney, Agent, or Firm* — Xsensus LLP

(57) ABSTRACT

An electronic device that includes a processing circuit configured to: receive information about a number N of candidate transmit beams from a user device, where N is an integer greater than 1; select from the N candidate transmit beams a transmit beam for sending downlink information to the user device; and determine, on the basis of the selected transmit beam, a transmission configuration indication (TCI) state, and send the TCI state to the user device. The electronic device, the wireless communication method and the computer readable storage medium enable a network-side device to notify the user device of the information about transmit beams.

7 Claims, 13 Drawing Sheets

(51) Int. Cl.
  *H04L 5/00* (2006.01)
  *H04W 56/00* (2009.01)
(52) U.S. Cl.
  CPC .......... *H04B 7/086* (2013.01); *H04L 5/0051* (2013.01); *H04W 56/001* (2013.01)
(58) Field of Classification Search
  CPC ... H04L 5/0051; H04L 5/0057; H04W 56/001
  See application file for complete search history.

(56) References Cited

U.S. PATENT DOCUMENTS

| | | | |
|---|---|---|---|
| 2018/0288645 A1* | 10/2018 | Lee | H04B 17/382 |
| 2018/0323850 A1* | 11/2018 | Baligh | H04W 48/12 |
| 2019/0141691 A1 | 5/2019 | Kwon et al. | |
| 2019/0182093 A1 | 6/2019 | Jayawardene et al. | |
| 2020/0029297 A1 | 1/2020 | Baek et al. | |
| 2020/0162954 A1* | 5/2020 | Seo | H04W 56/001 |
| 2020/0267571 A1 | 8/2020 | Park et al. | |
| 2020/0288479 A1* | 9/2020 | Xi | H04W 72/042 |

FOREIGN PATENT DOCUMENTS

| | | |
|---|---|---|
| CN | 106374984 A | 2/2017 |
| WO | 2014/178687 A1 | 11/2014 |
| WO | 2017/184303 A1 | 10/2017 |

OTHER PUBLICATIONS

"Beam indication, measurements and reporting", 3GPP SG RAN WG1 Meeting #91, Reno, Nevada, USA, Nov. 27-Dec. 1, 2017 (R1-1720890) (Year: 2017).*
U.S. Appl. No. 62/478,616, filed Mar. 30, 2017 (Year: 2017).*
International Search Report and Written Opinion dated Mar. 21, 2019 for PCT/CN2019/070379 filed on Jan. 4, 2019, 09 pages including English Translation of the International Search Report.
Nokia and Nokia Shanghai Bell, "Beam indication. Measurements and Reporting," 3GPP TSG RAN WGJ Meeting #91, R1-1720890, Reno, Nevada, USA, Nov. 27-Dec. 1, 2017, 11 pages.

* cited by examiner

| CSI-RS Resource ID |
|---|
| CSI-RS Resource 1 |
| CSI-RS Resource 2 |
| CSI-RS Resource 3 |
| CSI-RS Resource 4 |

FIG. 3A

| CSI-RS Resource ID | RSRP Value |
|---|---|
| CSI-RS Resource 1 | RSRP Value 1 |
| CSI-RS Resource 2 | RSRP Value 2 |
| CSI-RS Resource 3 | RSRP Value 3 |
| CSI-RS Resource 4 | RSRP Value 4 |

FIG. 3B

| CSI-RS Resource ID | RSRP Value |
|---|---|
| CSI-RS Resource 1 |  |
| CSI-RS Resource 2 | RSRP Value 2 |
| CSI-RS Resource 3 | RSRP Value 3 |
| CSI-RS Resource 4 |  |

FIG. 3C

| TCI State | SSB Resource ID | QCL Type |
|---|---|---|
| 000 | SSB Resource 1 | 4 |
| 001 | SSB Resource 2 | 4 |
| 010 | SSB Resource 3 | 4 |
| 011 | SSB Resource 4 | 4 |
| 100 | SSB Resource 5 | 4 |
| 101 | SSB Resource 6 | 4 |
| 110 | SSB Resource 7 | 4 |
| 111 | SSB Resource 8 | 4 |

| A combination of 2 transmitted beams selected from 4 transmitted beams | Combination identification |
|---|---|
| 1 1 0 0 | 000 |
| 1 0 1 0 | 001 |
| 1 0 0 1 | 010 |
| 0 1 1 0 | 011 |
| 0 1 0 1 | 100 |
| 0 0 1 1 | 101 |

| An arrangement of 2 transmitted beams selected from 4 transmitted beams | Arrangement identification |
|---|---|
| 00, 01 | 0000 |
| 00, 10 | 0001 |
| 00, 11 | 0010 |
| 01, 00 | 0011 |
| 01, 10 | 0100 |
| 01, 11 | 0101 |
| 10, 00 | 0110 |
| 10, 01 | 0111 |
| 10, 11 | 1000 |
| 11, 00 | 1001 |
| 11, 01 | 1010 |
| 11, 10 | 1011 |

ELECTRONIC DEVICE, WIRELESS COMMUNICATION METHOD AND COMPUTER READABLE STORAGE MEDIUM RELATED TO TRANSMISSION CONFIGURATION INDICATION (TCI) STATE

CROSS-REFERENCE TO RELATED APPLICATIONS

The present application is a continuation of U.S. application Ser. No. 16/646,153, filed Mar. 11, 2020, which is based on PCT filing PCT/CN2019/070379, filed Jan. 4, 2019, which claims priority to Chinese Patent Application No. 201810026604.1, filed Jan. 11, 2018 with the Chinese Patent Office, each of which is incorporated herein by reference in its entirety.

TECHNICAL FIELD

Embodiments of the present disclosure generally relate to the field of wireless communication, and in particular to an electronic equipment, a wireless communication method and a computer-readable storage medium. More particularly, the present disclosure relates to an electronic equipment as a network side device in a wireless communication system, an electronic equipment as a user equipment in a wireless communication system, a wireless communication method executed by a network side device in a wireless communication system, a wireless communication method executed by a user equipment in a wireless communication system and a computer-readable storage medium.

BACKGROUND

Beamforming is a signal preprocessing technology based on an antenna array. Beamforming produces a directional beam by adjusting weighting coefficients of each element in the antenna array, such that a significant array gain can be obtained. Therefore, beamforming technology has great advantages in terms of expanding coverage range, improving edge throughput and suppressing interference and the like.

In downlink transmission, a network side device selects a transmitted beam from multiple transmitted beams to transmit downlink information, in a case that a user equipment has multiple received beams, it is required to select an appropriate received beam to receive downlink information transmitted by the network side device, such that a beamforming gain can be obtained. In this case, the user equipment needs to know related information about the transmitted beam to determine that which received beam may be used to receive the downlink information transmitted by the network side device through the transmitted beam. Therefore, how the network side device notifies the related information about the transmitted beam to the user equipment and how the user equipment determines the appropriate received beam are urgent technical problems to be solved.

Therefore, the present disclosure aims to provide an electronic equipment, a wireless communication method and a computer-readable storage medium, so as to solve at least one of the above technical problems.

SUMMARY

This section provides a general summary of the present disclosure, instead of a comprehensive disclosure of full scope or all features of the present disclosure.

The present disclosure aims to provide an electronic equipment, a wireless communication method and a computer-readable storage medium, such that user equipment may determine an appropriate received beam based on transmitted beam of the network side device, thereby improving a system gain.

According to one aspect of the present disclosure, an electronic equipment is provided. The electronic equipment includes a processing circuit configured to: receive, from a user equipment, information about N candidate transmitted beams, where N is an integer greater than 1; select, from the N candidate transmitted beams, a transmitted beam for transmitting downlink information to the user equipment; and determine a Transmission Configuration Indication TCI state according to the selected transmitted beam, and transmit the TCI state to the user equipment.

According to another aspect of the present disclosure, an electronic equipment is provided. The electronic equipment includes a processing circuit configured to: receive, from a network side device, a Transmission Configuration Indication TCI state; and determine a received beam for receiving downlink information from the network side device according to the TCI state.

According to another aspect of the present disclosure, a wireless communication method is provided. The wireless communication method includes: receiving, from a user equipment, information about N candidate transmuted beams, where N is an integer greater than 1; selecting, from the N candidate transmitted beams, a transmitted beam for transmitting downlink information to the user equipment; and determining a Transmission Configuration Indication TCI state according to the selected transmitted beam, and transmitting the TCI state to the user equipment.

According to another aspect of the present disclosure, a wireless communication method is provided. The wireless communication method includes: receiving, from a network side device, a Transmission Configuration Indication TCI state; and determining a received beam for receiving downlink information from the network side device according to the TCI state.

According to another aspect of the present disclosure, a computer-readable storage medium is provided. The computer-readable storage medium includes computer-executable instructions, which when executed by a computer, cause the computer to perform the wireless communication method according to the present disclosure.

Using the electronic equipment, the wireless communication method and the computer-readable storage medium according to the present disclosure, the network side device may select a transmitted beam for transmitting downlink information from N candidate transmitted beams provided by the user equipment, and notify information about the selected transmitted beam to the user equipment through the TCI state. Further, the user equipment may determine a received beam for receiving downlink information based on the received TCI state. In this way, the network side device may provide information about the selected transmitted beam to the user equipment, such that the user equipment may determine a received beam corresponding to the transmitted beam used by the network side device to receive downlink information, thereby improving a system gain.

Further applicability will become apparent from the description provided herein. The description and specific examples are provided only for illustration rather than limitation to the present disclosure.

BRIEF DESCRIPTION OF THE DRAWINGS

The drawings described herein are for illustrative purposes only instead of showing all possible implementations, and are not intended to limit the scope of the present disclosure. In the drawings:

FIG. 3(a) is a schematic diagram showing contents of information about N candidate transmitted beams according to an embodiment of the present disclosure;

FIG. 3(b) is a schematic diagram showing contents of information about N candidate transmitted beams according to another embodiment of the present disclosure:

FIG. 3(c) is a schematic diagram showing contents of information about N candidate transmitted beams according to yet another embodiment of the present disclosure;

Figure 1:
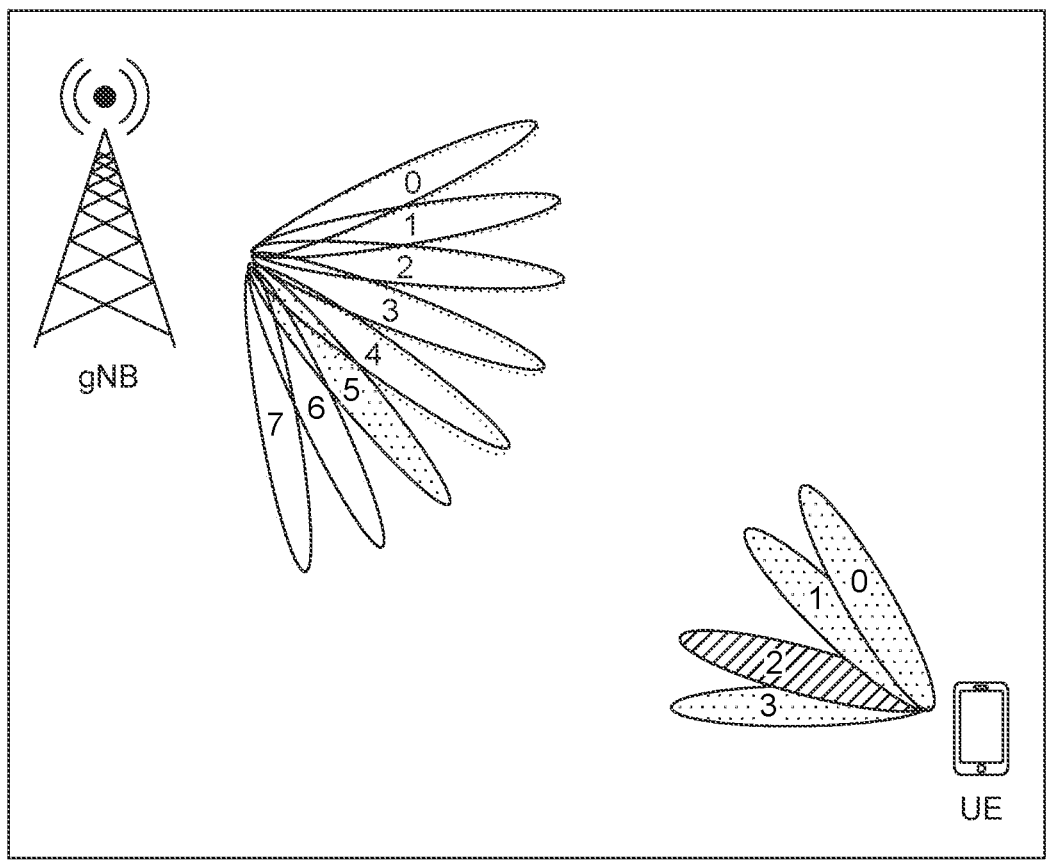
FIG. 1 is a schematic diagram showing an application scenario according to an embodiment of the present disclosure.

While embodiments of the present disclosure may be modified and replaced in various manners, specific embodiments are shown as examples in the drawings and are described in detail herein. It should be understood that description for the specific embodiments is not intended to limit the present disclosure into a disclosed specific form, and the present disclosure aims to cover all modification, equivalents and alternations within the spirit and scope of the present disclosure. It is noted that throughout the several figures, corresponding reference numerals indicate corresponding parts.

DETAILED DESCRIPTION OF THE EMBODIMENTS

Examples in the present disclosure will be described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Examples of numerous specific details, such as specific components, devices, and methods, are set forth to provide a thorough understanding of the embodiments of the present disclosure. It will be apparent to those skilled in the art that exemplary embodiments may be implemented in many different forms without the use of specific details, which should not be construed as limiting the scope of the present disclosure, in some exemplary embodiments, well-known processes, well-known structures, and well-known technologies are not described in detail.

The description includes the following sections:
1. Description of a scenario;
2. Configuration example of a network side device;
3. Configuration example of a user equipment;
4. Method embodiment; and
5. Application example.

<1. Description of a Scenario>

Figure 2:
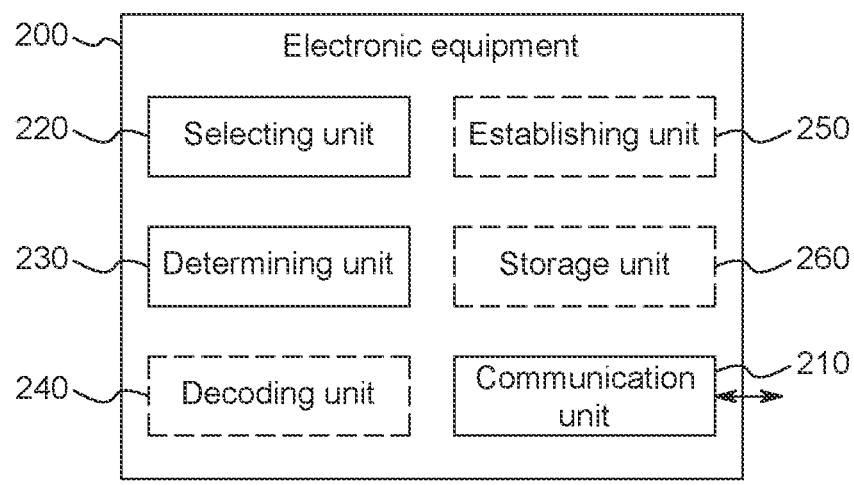
FIG. 2 is a block diagram showing an example of a configuration of an electronic equipment according to an embodiment of the present disclosure.

FIG. 1 is a schematic diagram showing an application scenario according to the present disclosure. As shown in FIG. 2, 8 transmitted beams of a gNB (a base station in 5 th generation communications system) are shown, which are numbered 0 to 7 respectively, and 4 received beams of a UE (User Equipment) within coverage range of the gNB are shown, which are numbered 0 to 3 respectively. In a case that the gNB selects a transmitted beam numbered 5 to transmit downlink data to the UE, the UE should select a received beam numbered 2 to match the transmitted beam, such that a better receiving effect can be implemented. In this case, the UE needs to obtain information related to the transmitted beam numbered 5 of the gNB and determine that the received beam numbered 2 is adopted to receive downlink data.

For such a scenario, an electronic equipment in a wireless communication system, a wireless communication method performed by the electronic equipment in the wireless communication system and a computer-readable storage medium according to the present disclosure are provided, such that the user equipment may determine an appropriate received beam based on a transmitted beam of a network side device, thereby improving a system gain. It should be noted that, although FIG. 1 shows 8 transmitted beams of the gNB, the gNB may also have other number of multiple transmitted beams, and although FIG. 1 shows 4 received beams of the UE, the UE may also have other number of multiple received beams. That is, the present disclosure is applicable to all scenarios in which the network side device has multiple transmitted beams and the user equipment has multiple received beams.

Both the network side device and the UE according to the present disclosure may be included in a wireless communication system, and the wireless communication system herein may be, for example, a NR (New Radio) communication system.

The network side device according to the present disclosure may be any type of TRP (Transmit and Receive Port). The TRP may have functions of transmission and reception. For example, the TRP may receive information from a user equipment and a base station device and may also transmit information to the user equipment and the base station device. In one example, the TRP may provide services to the user equipment and is controlled by the base station device. That is, the base station dev ice provides services to the user equipment through the TRP. Furthermore, the network side device described in the present disclosure may also be a base station dev ice, such as an eNB or a gNB.

The user equipment according to the present disclosure may be implemented as a mobile terminal (such as a smart phone, a tablet personal computer (PC), a notebook PC, a portable game terminal, a portable/dongle type mobile router, and a digital camera device) or an in-vehicle terminal (such as a vehicle navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single chip) mounted on each of the above terminals.

<2. Configuration Example of a Network Side Device>

FIG. 2 is a block diagram showing an example of a configuration of an electronic equipment 200 according to an embodiment of the present disclosure. The electronic equipment 200 may serve as a network side device in a wireless communication system. Specifically, the electronic equipment 200 may serve as a base station device or a TRP in a wireless communication system.

As shown in FIG. 2, the electronic equipment 200 may include a communication unit 210, a selecting unit 220 and a determining unit 230.

Various units of the electronic equipment 200 may be included in a processing circuit. It should be noted that the electronic equipment 200 may include one processing circuit or multiple processing circuits. Further, the processing circuit may include various separated functional units to perform various different functions and/or operations. It should be noted that these functional units may be physical entities or logical entities, and units of different names may be implemented by a same physical entity.

According to an embodiment of the present disclosure, the communication unit 210 may receive information about N candidate transmitted beams from a user equipment. N is an integer greater than 1. According to an embodiment of the present disclosure, the user equipment may be a user equipment to which the electronic equipment 200 provides services. For example, in a case that the electronic equipment 200 is a base station device, the user equipment may be a user equipment within coverage range of the electronic equipment 200. In a case that the electronic equipment 200 is a TRP, the user equipment may be a user equipment to which the electronic equipment 200 provides services.

According to an embodiment of the present disclosure, the selecting unit 220 may select, from the N candidate transmitted beams, a transmitted beam for transmitting downlink information to the user equipment. The N candidate transmitted beams herein are transmitted beams of the electronic equipment 200 that may be used to transmit downlink information. The selecting unit 220 may select, from N candidate transmitted beams reported by the user equipment, a transmitted beam for transmitting downlink information.

According to an embodiment of the present disclosure, the determining unit 230 may determine a Transmission Configuration Indication TCI state based on the selected transmitted beam, such that the communication unit 210 may transmit the TCI state to the user equipment.

It can be seen that, the electronic equipment 200 according to an embodiment of the present disclosure may select, from N candidate transmitted beams provided by the user equipment, a transmitted beam for transmitting downlink information and determine a TCI state corresponding to the selected transmitted beam, to notify the user equipment. Thus, the electronic equipment 200 may notify information related to the selected transmitted beam to the user equipment by using the TCI state, such that the user equipment may obtain information related to the transmitted beam selected by the electronic equipment 200, thereby selecting an appropriate received beam.

As shown in FIG. 2, the electronic equipment 200 may also include a decoding unit 240 configured to decode information about the N candidate transmitted beams.

According to an embodiment of the present disclosure, the decoding unit 240 may determine identification information of the N candidate transmitted beams based on the information about the N candidate transmitted beams. That is, the decoding unit 240 may decode the information about the N candidate transmitted beams, thereby determining the identification information of the N candidate transmitted beams.

In the present disclosure, identifications of the transmitted beams may be represented by identifications of CSI-RS (Channel State information-Reference Signal) resources. This is because a CSI-RS is transmitted using different resources for different transmitted beams. That is, the transmitted beams correspond to the CSI-RS resources one to one. Therefore, the identifications of the transmuted beams may be represented by the identifications of the CSI-RS resources.

FIG. 3(a) is a schematic diagram showing contents of information about N candidate transmitted beams according to an embodiment of the present disclosure. As shown in FIG. 3(a), the information about the N candidate transmitted beams may include identification information of the N candidate transmitted beams. N is 4 and identifications of the candidate transmitted beams are represented by the identifications of the CSI-RS resources. In FIG. 3(a), CSI-RS resource 1 represents a CSI-RS resource numbered 1, CSI-RS resource 2 represents a CSI-RS resource numbered 2, CSI-RS resource 3 represents a CSI-RS resource numbered 3, CSI-RS resource 4 represents a CSI-RS resource numbered 4, and the 4 CSI-RS resources correspond to 4 candidate transmitted beams respectively. According to an embodiment of the present disclosure, the decoding unit 240 may determine identification information of the N candidate transmitted beams as shown in FIG. 3(a).

According to an embodiment of the present disclosure, the decoding unit 240 may determine order information of the N candidate transmitted beams based on the information about the N candidate transmitted beams. That is, the decoding unit 240 may decode the information about the N candidate transmitted beams, thereby determining the identification information and the order information of the N candidate transmitted beams. A manner in which the user equipment reports the information about die N candidate transmitted beams may be previously agreed between the electronic equipment 200 and the user equipment. For example, the electronic equipment 200 may configure such information for the user equipment, which will be described in detail hereinafter. In a case that the user equipment reports die information about the N candidate transmitted beams in an ordered manner is previously agreed, for example, the information about the N candidate transmitted beams is sequentially reported in a manner of ascending order or descending order, the decoding unit 240 may determine the order information of the N candidate transmitted beams based on encoding order of the identifications of the N candidate transmitted beams.

As shown in FIG. 3(a), it is assumed that the information of the N candidate transmitted beams is reported in a manner of descending order is previously agreed between the electronic equipment 200 and the user equipment, after the decoding unit 240 sequentially decodes the CSI-RS resource 1, the CSI-RS resource 2, the CSI-RS resource 3 and the CSI-RS resource 4, it is considered that the candidate transmitted beams are arranged in descending order, including: a candidate transmitted beam represented by the CSI-RS resource 1; a candidate transmitted beam represented by the CSI-RS resource 2; a candidate transmitted beam represented by the CSI-RS resource 3; and a candidate transmitted beam represented by the CSI-RS resource 4. That is, the candidate transmitted beam represented by the CSI-RS resource 1 is optimal and the candidate transmitted beam represented by the CSI-RS resource 4 is the worst.

According to an embodiment of the present disclosure, in a case that the decoding unit 240 determines the order information of the N candidate transmitted beams based on the information about the N candidate transmitted beams, the selecting unit 220 may select a transmitted beam for transmitting downlink information to the user equipment based on the order information of the N candidate transmitted beams. For example, the selecting unit 220 may select an optimal transmitted beam in the N candidate transmitted beams for transmitting downlink information to the user equipment.

According to an embodiment of the present disclosure, the decoding unit 240 may further determine channel quality information between all or a part of candidate transmitted beams in the N candidate transmitted beams and the user equipment based on the information about the N candidate transmitted beams. That is, the decoding unit 240 may decode the information of the N candidate transmitted beams, thereby determining identification information of the N candidate transmitted beams and the channel quality information between all or a part of candidate transmitted beams in the N candidate transmitted beams and the user equipment According to an embodiment of the present disclosure, the channel quality information may be represented by various parameters, including but not limited to RSRP (Reference Signal Receiving Power), RSRQ (Reference Signal Receiving Quality) and BLER (Block Error Rate).

FIG. 3(b) is a schematic diagram showing contents of information about N candidate transmitted beams according to another embodiment of the present disclosure. As shown in FIG. 3(b), the information about the N candidate transmitted beams may include identification information of the N candidate transmitted beams and channel quality information between each of the N candidate transmitted beams and a user equipment. N is 4 and identifications of the candidate transmitted beams are represented by identifications of CSI-RS resources, and channel qualities between the candidate transmitted beams and the user equipment are represented by RSRP values. For example, a RSRP between a candidate transmitted beam represented by the CSI-RS resource 1 and the user equipment is RSRP value 1, a RSRP between a candidate transmitted beam represented by the CSI-RS resource 2 and the user equipment is RSRP value 2, a RSRP between a candidate transmitted beam represented by the CSI-RS resource 3 and tire user equipment is RSRP value 3, and a RSRP between a candidate transmitted beam represented by the CSI-RS resource 4 and the user equipment is RSRP value 4. That is. FIG. 3(b) shows a case in which the information about the N candidate transmitted beams includes the channel quality information between each of the N candidate transmitted beams and the user equipment. That is, the user equipment reports the channel quality information between each of the N candidate transmitted beams and the user equipment when reporting the N candidate transmitted beams. The report manner used by the user equipment may be referred to as a "full report", and the report manner shown in FIG. 3(a) may be referred to as a "partial report".

FIG. 3(c) is a schematic diagram showing contents of information about N candidate transmitted beams according to yet another embodiment of the present disclosure. As shown in FIG. 3(c), the information about the N candidate transmitted beams may include identification information of the N candidate transmitted beams and channel quality information between a part of the N candidate transmuted beams and a user equipment. This report manner may be referred to as a "hybrid report". N is 2 and identifications of the candidate transmitted beams are represented by identifications of CSI-RS resources, and channel qualities between the candidate transmitted beams and the user equipment are represented by RSRP values. For example, a RSRP between a candidate transmitted beam represented by the CSI-RS resource 2 and the user equipment is RSRP value 2, and a RSRP between a candidate transmitted beam represented by the CSI-RS resource 3 and the user equipment is RSRP value 3.

According to an embodiment of the present disclosure, the information about the N candidate transmitted beams may only include a maximum value and a minimum value included in the channel quality information between the N candidate transmitted beams and the user equipment. For example, in FIG. 3(c), it is assumed that among the RSRPs between the 4 candidate transmitted beams and the user equipment, the RSRP between the candidate transmitted beam represented by the CSI-RS resource 2 and the user equipment is the maximum value which is RSRP value 2, and the RSRP between the candidate transmitted beam represented by the CSI-RS resource 3 and the user equipment is the minimum value which is RSRP value 3, the information about the N candidate transmitted beams may only include identification information of the 4 candidate transmitted beams, the RSRP value 2 and the RSRP value 3.

According to an embodiment of the present disclosure, in a case that the decoding unit 240 determines channel quality information between all or a part of candidate transmitted beams in the N candidate transmitted beams and the user equipment based on the information about the N candidate transmitted beams, the selecting unit 220 may select a transmitted beam for transmitting downlink information to the user equipment based on the channel quality information between the all or a part of candidate transmitted beams and the user equipment. For example, the selecting unit 220 may select a candidate transmitted beam with the best channel quality for transmitting downlink information to the user equipment.

As described above, the selecting unit 220 may select the transmitted beam for transmitting downlink information to the user equipment based on the information about the N candidate transmitted beams. The process of selection may follow criteria such as: the order information of the N candidate transmitted beams; and the channel quality information between all or a part of the N candidate transmitted beams and the user equipment and the like. Alternatively, the selecting unit 220 may also select a transmitted beam based on other criteria, which are not limited in the present disclosure. The selecting unit 220 may only select one transmitted beam for transmitting downlink information. Next, the determining unit 230 may determine a TCI stale based on the selected transmitted beam.

According to an embodiment of the present disclosure, the determining unit 230 may determine a beam for transmitting a Synchronization Signal Block SSB corresponding to the selected transmitted beam.

According to an embodiment of the present disclosure, during an initial access of the user equipment, the electronic equipment 200 may transmit a SSB (which includes a synchronization signal such as a primary synchronization signal and a secondary synchronization signal) to the user equipment by using a beam. Similar to transmitting a CSI-RS, a SSB is transmitting using different resources for different beams used for transmitting the SSB. That is, beams used for transmitting the SSB correspond to SSB resources one to one, and therefore, in the present disclosure, the beams for transmitting the SSB may be represented by identifications of the SSB resources. Furthermore, according to an embodiment of the present disclosure, a radiation range in space of the beams for transmitting the SSB during the initial access is greater titan or equal to a radiation range of transmitted beams for transmitting downlink information during data transmission. That is, one or more transmitted beams for transmitting downlink information may be included in a radiation range of the beams for transmitting the SSB. That is, from the perspective of space, one beam for transmitting a SSB may include one or more transmitted beams for transmitting downlink information.

According to an embodiment of the present disclosure, the determining unit 230 may determine a beam for transmitting a Synchronization Signal Block SSB corresponding to the selected transmitted beam, such that a radiation range of the selected transmitted beam is within a radiation range of a beam for transmitting the SSB corresponding to the selected transmitted beam. That is, the determining unit 230 may determine that the selected transmitted beam is within a radiation range of which of beams for transmitting the SSB thereby determining that the beam for transmitting the SSB is a beam for transmitting the SSB corresponding to the selected transmitted beam, and the beam may be represented by identification of the SSB resource.

According to an embodiment of the present disclosure, the determining unit 230 may determine a TCI state to be transmitted to the user equipment based on a mapping relation between the TCI state and the beam for transmitting the SSB.

Figures 4, 5:
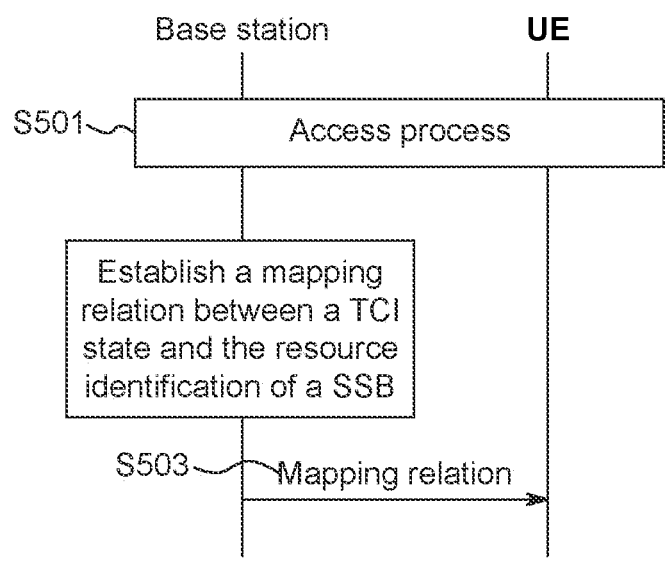
FIG. 4 is a schematic diagram showing a mapping relation between a TCI (Transmission Configuration Indication) state and resource identification information of a SSB (Synchronization Signal Block) according to an embodiment of the present disclosure.
FIG. 5 is a signaling flowchart showing that a network side device and a user equipment obtain a mapping relation between a TCI state and resource identification information of a SSB according to an embodiment of the present disclosure.

FIG. 4 is a schematic diagram showing a mapping relation between a TCI state and resource identification information of a SSB according to an embodiment of the present disclosure. In FIG. 4, beams for transmitting SSB are represented by identifications of SSB resources. FIG. 4 shows 8 identifications of the SSB resources, ranging from SSB resource ID (Identification) 1 to SSB resource ID 8. Therefore, the electronic equipment 200 may use 3-bit TCI state to represent the 8 identifications of the SSB resources, ranging from 000 to 111. In FIG. 4, QCL (Quasi Co-Location) represents that a relationship between a synchronization signal in a SSB and downlink information (for example, CSI-RS) transmitted by a transmitted beam in a space range of beams for transmitting a SSB is a quasi co-location relation, that is, a user equipment may adopt the same received beam to receive beams for transmitting the SSB and transmitted beams for transmitting downlink information within a space range of the beams. That is, the TCI may be used for representing that there is a QCL relationship between the synchronization signal in the SSB and the downlink information (for example, CSI-RS) transmitted by the transmitted beams. Further, a QCL type shown in FIG. 4 represents that the QCL type parameter is used for a time domain or a spatial domain. The QCL type shown in FIG. 4 is 4, which represents that the QCL type parameter may be used for the spatial domain. According to an embodiment of the present disclosure, after determining a beam for transmitting a SSB corresponding to the selected transmitted beam, the determining unit 230 may determine a TCI state to be transmitted based on a mapping relation shown in FIG. 4. For example, it is assumed that the determining unit 230 determines that the beam for transmitting the SSB corresponding to the selected transmitted beam is a beam represented by SSB resource ID 3, it may be determined that the TCI state to be transmitted is 010.

As shown in FIG. 2, the electronic equipment 200 may further include an establishing unit 250 configured to establish a mapping relation between the TCI state and the beam for transmitting a SSB after an initial access is completed. The electronic equipment 200 may establish a mapping relation as shown in FIG. 4 for each of user equipments. After the initial access of the user equipment is completed, the establishing unit 250 may determine all of beams for transmitting the SSB that can be identified by the user equipment, and determine a TCI state for each of beams based on the beams, thereby establishing a mapping relation as shown in FIG. 4. Further, the communication unit 210 may also transmit, to the user equipment, the mapping relation between the TCI state and the beam for transmitting the SSB, such that the user equipment may determine corresponding beam for transmitting the SSB after receiving the TCI state.

As shown in FIG. 2, the electronic equipment 200 may further include a storage unit 260 configured to store the mapping relation between the TCI state and the beam for transmitting the SSB, such that the determining unit 230 may determine the TCI state to be transmitted to the user equipment based on the mapping relation between tire TCI state and the beam for transmitting the SSB stored in the storage unit 260.

FIG. 5 is a signaling flowchart showing a network side device and user equipment acquiring a mapping relation between a TCI state and a beam of transmitting a SSB according to an embodiment of the present disclosure. In FIG. 5, the beam for transmitting the SSB is still represented by a SSB resource ID. As shown in FIG. 5, in step S501, a process of initial access is performed between a base station and a user equipment. The present disclosure does not focus on the process of initial access, and therefore the process is not described in detail. Next, in step S502, the base station establishes a mapping relation between a TCI state and a SSB resource ID and stores the mapping relation. Next, in step 503, the base station transmits the mapping relation between the TCI state and the SSB resource ID to the user equipment. Thus, both the base station and the user equipment may obtain and store the mapping relation between the TCI state and resource identification information of the SSB.

As described above, there is a mapping relation between the TCI state and beams for transmitting die SSB to which the selected transmitted beam belongs, and therefore, the electronic equipment 200 may report information about the selected transmitted beam to the user equipment by using the TCI state, such that the user equipment may know the information about the selected transmitted beam, thereby selecting an appropriate received beam.

According to an embodiment of the present disclosure, die electronic equipment 200 may transmit the TCI state to the user equipment through a low-level signaling, including but not limited to DCI (Downlink Control Information)

According to an embodiment of the present disclosure, the communication unit 200 may periodically receive, from the user equipment, the information about the N candidate transmitted beams. Furthermore, the communication unit 210 may also send a request to the user equipment to request the user equipment to report the information about the N candidate transmitted beams, thereby obtaining the information about the N candidate transmitted beams. That is, the electronic equipment 200 may configure a manner of reporting the N candidate transmitted beams for the user equipment as needed. In one exemplary embodiment, the communication unit 210 may periodically receive, from the user equipment, the information about the N candidate transmitted beams as shown in FIG. 3(*a*), and send a request to the user equipment to obtain the information about the N candidate transmitted beams as shown in FIG. 3(*b*) and FIG. 3(*c*) if needed.

According to an embodiment of the present disclosure, the electronic equipment 200 may configure the related information about reporting N candidate transmitted beams for the user equipment. For example, the electronic equipment 200 may configure a number of the N candidate transmitted beams and transmit configuration information about the number of the N candidate transmitted beams to the user equipment. In an embodiment, the electronic equipment 200 may transmit the configuration information about the number of the N candidate transmitted beams to the user equipment through a high-level signaling, including but not limited to an RRC (Radio Resource Control) signaling. In an embodiment, N may be $2^n$, where n is a nonnegative integer such as 1, 2, 4 and 8.

According to an embodiment of the present disclosure, the electronic equipment 200 may transmit K transmitted beams to the user equipment for selecting, by the user equipment. N candidate transmitted beams from the K transmitted beams, where K is an integer greater than or equal to N. In an embodiment. K may be $2^k$, where K is a positive integer which is preferably 4, 8, 16, 32 or 64.

According to an embodiment of the present disclosure, die electronic equipment 200 may configure contents of the information about the N candidate transmitted beams which include the full report, the partial report and the hybrid report as described above, and transmit the configuration information of the contents of the information about the N candidate transmitted beams to the user equipment. In an embodiment, the electronic equipment 200 may transmit such configuration information to die user equipment through the low-level signaling, including but not limited to DCI. Further, the electronic equipment 200 may configure a default report manner as the partial report for the user equipment, and triggers the partial report and the hybrid report if needed, hi this case, the electronic equipment 200 may use 1 bit to represent such configuration information. For example, the full report is represented by 0 and the hybrid report is represented by 1.

According to an embodiment of the present disclosure, the electronic equipment 200 may configure a encoding mode about the information of the N candidate transmitted beams which are five report manners of the user equipment mentioned below, and transmits configuration information of the encoding mode about the information of the N candidate transmitted beams to the user equipment. In an embodiment, the electronic equipment 200 may transmit such configuration information to the user equipment through the low-level signaling, including but not limited to DCI. In an embodiment, the electronic equipment 200 may use 3 bits to represent such configuration information.

According to an embodiment of the present disclosure, the electronic equipment 200 may configure report triggering modes about the information of the N candidate transmitted beams, which include periodic triggering and event triggering. In a case of the periodic triggering, the electronic equipment 200 may transmit configuration information about reporting periods of the information of the N candidate transmitted beams to the user equipment. In a case of the event triggering, the electronic equipment 200 may send a request to the user equipment to request to report the information about the N candidate transmitted beams.

Thus, according to an embodiment of the present disclosure, the electronic equipment 200 may configure the related information about reporting the N candidate transmitted beams for the user equipment. Furthermore, in order to further save overhead, the network side device may further set some default configurations. For example, in a case of configuring the periodic report for the user equipment, the partial report manner may be configured for the user equipment. In a case of configuring the event report for the user equipment, the manners of the full report and the hybrid report may be configured for the user equipment. Illustration described above is only exemplary, and the electronic equipment 200 may further configure other information about reporting the N candidate transmitted beams.

According to an embodiment of the present disclosure, the TCI state may be used for indicating a received beam for receiving downlink information to the user equipment. That is, the TCI state is information associated with the received beam for receiving the downlink information by the user equipment. The downlink information may include controlling information such as a reference signal (which includes but not limited to CSI-RS). Specifically, the TCI may be used for representing that there is a QCL relation between the synchronization signal in the SSB and the downlink information (for example, CSI-RS) transmitted by the transmitted beams for transmitting downlink information included in a radiation range of beams for transmitting the SSB. In other words, the TCI state may be used for representing that there is a QCL relation between downlink information to be transmitted by the electronic equipment 200 and the synchronization signal transmitted by the beams for transmitting the SSB to which the selected transmitted beam belongs. That is, the user equipment may adopt the same received beam to receive a transmitted beam for transmitting downlink information and a beam for transmitting the SSB corresponding to the transmitted beam for transmitting the downlink information. In conclusion, the TCI state is information associated with the transmitted beams for transmitting the downlink information by the electronic equipment 200, and the user equipment knows a mapping relation between the transmitted beams and the received beams, such that the TCI state may indirectly indicate the received beams for receiving the downlink information to the use equipment.

Thus, it can be seen that the electronic equipment 200 according to an embodiment of the present disclosure may select a transmitted beam for transmitting downlink information from the N candidate transmitted beams provided by the user equipment, and determine a TCI state corresponding to the selected transmitted beam to notify the user equipment. Thus, the electronic equipment 200 may notify the user equipment of information related to the selected transmitted beam by using the TCI state, such that the user equipment may obtain the Information related to the transmitted beam selected by the electronic equipment 200, thereby selecting an appropriate received beam.

<3. Configuration Example of a User Equipment>

Figure 6:
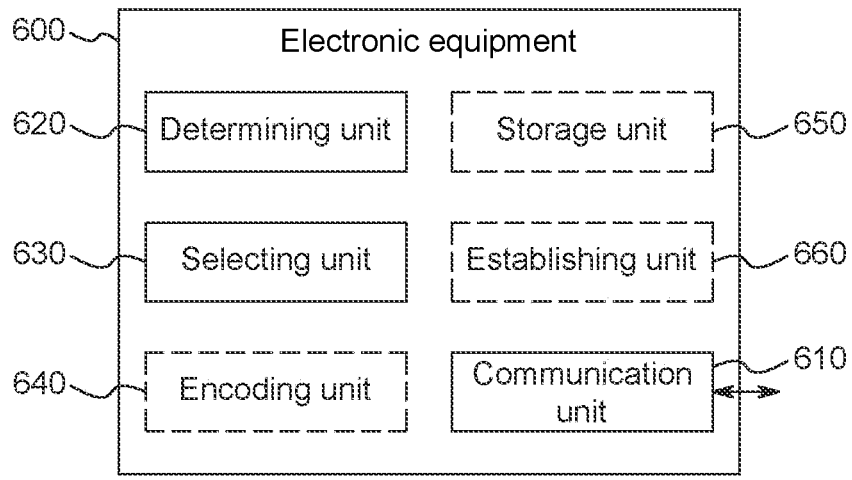
FIG. 6 is a block diagram showing an example of a configuration of an electronic equipment according to another embodiment of the present disclosure.

FIG. 6 is a block diagram showing a structure of an electronic equipment 600 serving as a user equipment in a wireless communication system according to an embodiment of the present disclosure. As shown in FIG. 6, the electronic equipment 600 may include a communication unit 610 and a determining unit 620.

Various units of the electronic equipment 600 may be included in a processing circuit. It should be noted that the electronic equipment 600 may include one processing circuit or multiple processing circuits. Further, the processing circuit may include various separated functional units to perform various different functions and/or operations. It should be noted that these functional units may be physical entities or logical entities, and units of different names may be implemented by a same physical entity.

According to an embodiment of the present disclosure, the communication unit 610 may receive, from a network side device, a Transmission Configuration Indication TCI state. The network side device may be a network side device providing services to the electronic equipment 600, and may be implemented by the electronic equipment 200 described above.

According to an embodiment of the present disclosure, the determining unit 620 may determine a received beam for receiving downlink information from the network side device based on the TCI state.

Thus, it can be seen that the electronic equipment 600 according to an embodiment of the present disclosure may determine a received beam for receiving downlink information based on a TCI state received from the network side device. As described above, the TCI state received from the network side device is associated with a transmitted beam selected by the network side device, such that the electronic equipment 600 may select an appropriate received beam based on the transmitted beam, thereby improving a system gain.

Figure 7:
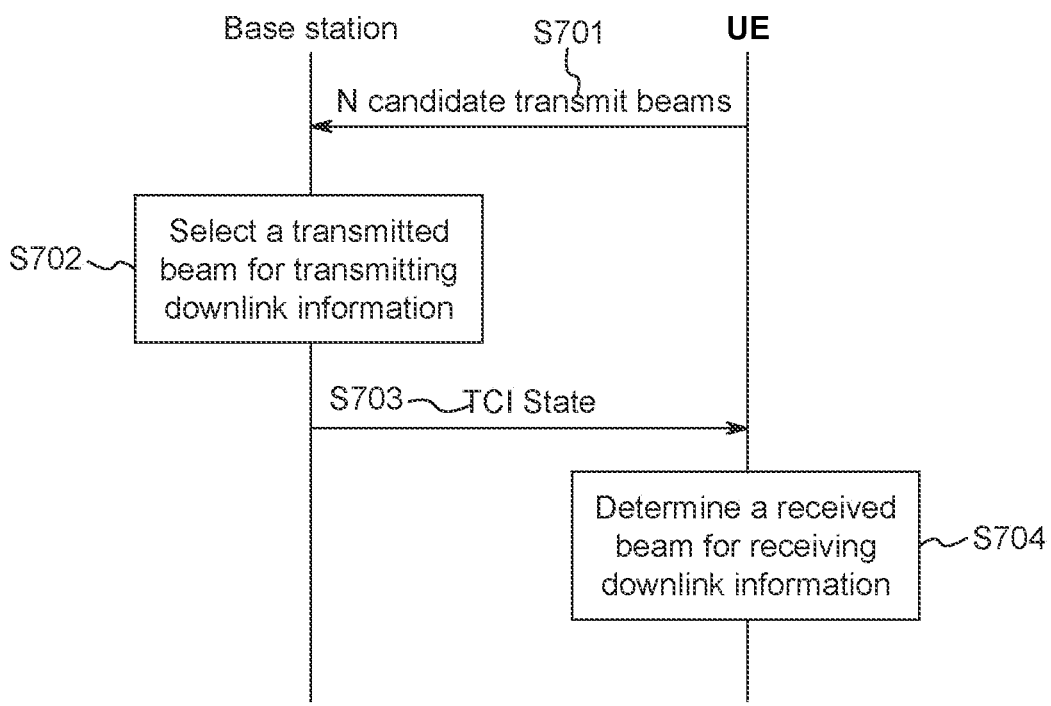
FIG. 7 is a signaling flowchart showing a method for determining a transmitted beam and a received beam according to an embodiment of the present disclosure.

FIG. 7 is a signaling flowchart showing a method for determining a transmitted beam and a received beam according to an embodiment of the present disclosure. As shown in FIG. 7, in step S701, a UE transmits information about N candidate transmitted beams to a base station. Next, in step S702, the base station selects, from the N candidate transmitted beams, a transmitted beam for transmitting downlink information to the UE. Next, in step S703, the base station determines a TCI state based on the selected transmitted beam and transmits the TCI state to the UE. Next, in step S704, the UE determines a received beam for receiving the downlink information based on the received TCI state. Therefore, the UE may determine an appropriate received beam based on the transmitted beam selected by the base station.

According to an embodiment of the present disclosure, the electronic equipment 600 may receive the TCI state from the network side device based on the low-level signaling, including but not limited to DCI.

According to an embodiment of the present disclosure, the communication unit 610 may further transmit, to the network side device, information about N candidate transmitted beams for selecting, by the network side device, a transmitted beam for transmitting downlink information to the electronic equipment from the N candidate transmitted beams, and determine the TCI state based on the selected transmitted beam, where N is an integer greater than 1.

According to an embodiment of the present disclosure, the communication unit 610 may receive K transmitted beams of the network side device from the network side device. Further, as shown in FIG. 6, the electronic equipment 600 may further include a selecting unit 630 configured to determine the N candidate transmitted beams based on channel quality between the K transmitted beams of the network side device and the electronic equipment 600, where K is an integer greater than or equal to N. That is, the selecting unit 630 may measure channel quality between each of the K transmitted beams and the electronic equipment 600, and selects, from the K transmitted beams, N transmitted beams with good channel quality as candidate transmitted beams based on the channel quality.

According to an embodiment of the present disclosure, the selecting unit 630 may determine the channel quality based on one or more of parameters including RSRP, RSRQ and BLER. Each of the above parameters may include multiple parameters. For example, the BLER may include a BLER for PDCCH (Physical Downlink Control Channel) and a BLER for PDSCH (Physical Downlink Share Channel).

According to an embodiments of the present disclosure, in a case of determining the channel quality based on one parameter such as RSRP, for example, the selecting unit 630 may measure a RSRP value between each of the K transmitted beams and the electronic equipment 600, and selects, from the K transmitted beams. N transmitted beam with the highest RSRP values as candidate transmitted beams. A case that the channel quality is represent by the RSRQ and the BLER is similar to the case that the channel quality is represent by the RSRP.

According to an embodiment of the present disclosure, the selecting unit 630 may further determine the channel quality based on two parameters. For example, die selecting unit 630 may select a transmitted beam dun meets the two following conditions as a candidate transmitted beam, including, a first channel quality parameter between the transmitted beam and the electronic equipment 600 meets a condition defined by a first channel quality parameter threshold (for example, the first channel quality parameter is greater than or less than die first channel quality parameter threshold, which depends on a specific representation of the first channel quality parameter. For example, in a case that the first channel quality parameter is the RSRP or the RSRQ, the first channel quality parameter needs to be greater than the first channel quality parameter threshold; in a case that the first channel quality parameter is the BLER, the first channel quality parameter needs to be less than the first channel quality parameter threshold; and such a criterion also applies to other channel quality parameters); and a second channel quality parameter between the transmitted beam and the electronic equipment 600 is the best top N of the second channel quality parameters of all transmitted beams.

The selecting unit 630 may implement the above selection by the following steps: first, the selection unit 630 may select, from the K transmitted beams, transmitted beams that the first channel quality parameter between the electronic equipment 600 and the transmitted beams is greater than or less than the first channel quality parameter threshold; and then, the selecting unit 630 may select, from the above transmitted beams, transmitted beams with the top N ranked second channel quality parameter as candidate transmitted beams.

According to an embodiment of the present disclosure, each of the RSRP, the RSRQ and the BLER may include multiple parameters, and therefore, there may be more than two conditions that a transmitted beam needs to meet. For example, the selecting unit 630 may also select a transmitted beam that meets the following three conditions as a candidate transmitted beam: the first channel quality parameter between the transmitted beam and the electronic equipment 600 meets a condition defined by the first channel quality parameter threshold; a third channel quality parameter between the transmitted beam and the electronic equipment 600 meets a condition defined by a third channel quality parameter threshold (for example, the third channel quality parameter is greater than or less than the third channel quality parameter threshold, which depends on a specific representation of the third channel quality parameter. For example, in a case that the third channel quality parameter is the RSRP or the RSRQ, the third channel quality parameter needs to be greater than the third channel quality parameter threshold, and in a case that the third channel quality parameter is the BLER, the third channel quality parameter needs to be less than the third channel quality parameter threshold); and the second channel quality parameter between the transmitted beam and the electronic equipment 600 is the best top N of the second channel quality parameters of all transmitted beams.

The selecting unit 630 may implement the above selection by the following steps: first, the selecting unit 630 may select, from the K transmitted beams, multiple transmitted beams that meet the following conditions: the first channel quality parameter between each of the multiple transmitted beams and the electronic equipment 600 is greater than or less than the first channel quality parameter threshold and the third channel quality parameter between each of the multiple transmitted beams and the electronic equipment 600 is greater than or less than the third channel quality parameter threshold; and then, the selecting unit 630 may select transmitted beams with the top N ranked second channel quality parameter from the multiple transmitted beams that meet conditions as candidate transmitted beams.

A specific example is given below. The BLER for the PDSCH is defined as the first channel quality parameter, the BLER for the PDCCH is defined as the third channel quality parameter, and the RSRP is defined as the second channel quality parameter. The first channel quality parameter threshold is 10% and the third channel quality parameter threshold is 1%. First, the selecting unit 630 may select transmitted beams with the BLER for the PDSCH which is less than 10% and the BLER for the PDCCH which is less than 1%; and then, the selecting unit 630 ranks the transmitted beams that meet the above conditions in order of large to small RSRP values, and selects the ranked top N transmitted beams as candidate transmitted beams.

As described above, an embodiment that the selecting unit 630 selects the N candidate transmitted beams based on one or two parameters is shown in an exemplary way. Alternatively, the selecting unit 630 may also select N candidate transmitted beams based on other criteria and may also select N candidate transmitted beams based on more parameters, such that the channel quality of the selected N candidate transmitted beams is good. Next, the electronic equipment 600 may report the selected N candidate transmitted beams to the network side device.

As shown in FIG. 6, the electronic equipment 600 may further include a encoding unit 640 configured to encode information of the N candidate transmitted beams to generate information about the N candidate transmitted beams for transmitting to the network side device.

According to an embodiment of the present disclosure, as shown in FIG. 3(a), the information about the N candidate transmitted beams may include identification information of the N candidate transmitted beams. Further, the information about the N candidate transmitted beams may include order information of the N candidate transmitted beams. For example, in a case that an ordered manner is agreed between the electronic equipment 600 and the network side device to report the N candidate transmitted beams, the encoding unit 640 may sequentially encode the information of the N candidate transmitted beams in a manner of descending order or ascending order. Furthermore, as shown in FIG. 3(b) and FIG. 3(c), the information of the N candidate transmitted beams may include the channel quality information between all or a part of candidate transmitted beams in the N candidate transmitted beams and the electronic equipment 600.

According to an embodiment of the present disclosure, the encoding unit 640 may express the identification of each of the N candidate transmitted beams by using binary coding. The encoding unit 640 may determine number of bits of the binary coding based on value of K. For example, in a case that K=8, that is, the electronic equipment 600 selects N candidate transmitted beams from 8 transmitted beams, the encoding unit 640 may express the identification of each of the candidate transmitted beams by using 3-bit binary coding.

Figure 8:
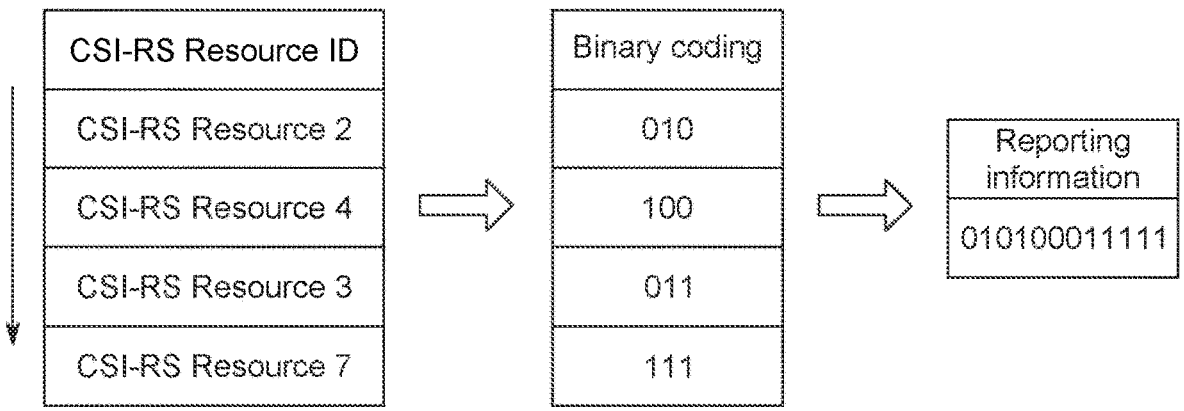
FIG. 8 is a schematic diagram showing a first method for reporting candidate transmitted beams according to an embodiment of the present disclosure.

FIG. 8 is a schematic diagram showing a first method for reporting candidate transmitted beams according to an embodiment of the present disclosure. As shown in FIG. 8, it is assumed that K=8 and N=4. The selecting unit 630 selects 4 transmitted beams from 8 transmitted beams (t CSI-RS resource 0 to 7), including: a transmitted beam represented by CSI-RS resource 2; a transmitted beam represented by CSI-RS resource 4; a transmitted beam represented by CSI-RS resource 3, a transmitted beam represented by CSI-RS resource 7, and the 4 transmitted beams are arranged in a descending order in direction of arrow. That is, the transmitted beam represented by the CSI-RS resource 2 is best and the transmitted beam represented by the CSI-RS resource 7 is worst. According to an embodiment of the present disclosure, the encoding unit 640 may determine that the identification of each of the candidate transmitted beams is expressed by 3 bits. That is, the transmitted beam represented by the CSI-RS resource 2 is expressed by 010, the transmitted beam represented by the CSI-RS resource 4 is expressed by 100, the transmitted beam represented by the CSI-RS resource 3 is expressed by 011, and the transmitted beam represented by the CSI-RS resource 7 is expressed by 111. Next the encoding unit 640 may combine the identification information of the N candidate transmitted beams to generate final report information. As shown in FIG. 8, the information about the N candidate transmitted beams is expressed by 010100011111. Furthermore, the information about the N candidate transmitted beams shown in FIG. 8 includes the order information of the N candidate transmitted beams. That is, the network side device may obtain the order information of the N candidate transmitted beams when decoding the information of the N candidate transmitted beams, if the 4 candidate transmitted beams as shown in FIG. 8 are reported in unordered manner, the order of identification information of the 4 candidate transmitted beams after being encoded may be changed. For example, the reported information may be expressed by 0100111001111.

According to an embodiment of the present disclosure, the encoding unit 640 may express the identification of the N candidate transmitted beams by using a bit map. That is, the encoding unit 640 may determine bits of the bit map based on value of K. A bit in the bit map of 1 indicates that a transmitted beam corresponding to the bit is selected as a candidate transmitted beam and a bit in the bit map of 0 indicates that a transmitted beam corresponding to the bit is not selected as a candidate transmitted beam.

Figure 9:
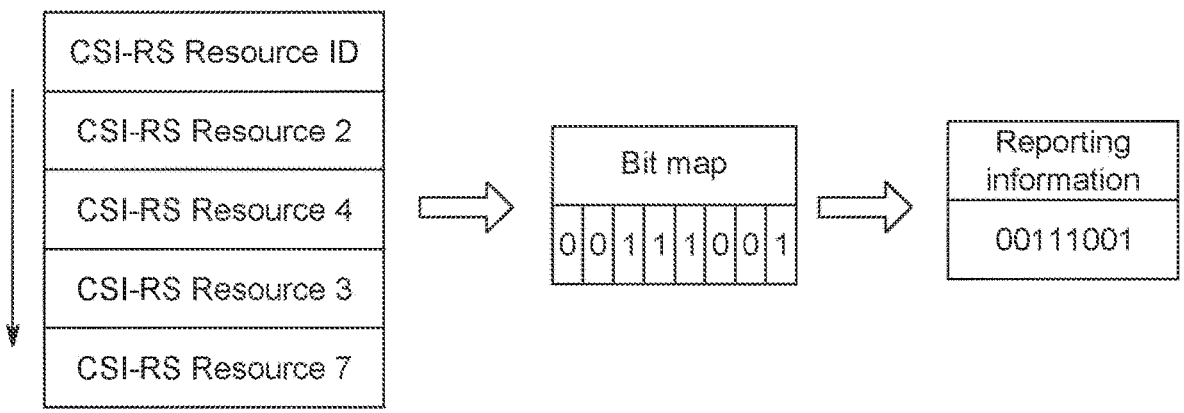
FIG. 9 is a schematic diagram showing a second method for reporting candidate transmitted beams according to an embodiment of the present disclosure.

FIG. 9 is a schematic diagram showing a second method for reporting candidate transmitted beams according to an embodiment of the present disclosure. As shown in FIG. 9, it is still assumed that K=8, N=4, and the selecting unit 630 selects 4 transmitted beams from 8 transmitted beams (CSI-RS resource 0 to 7), including: a transmitted beam represented by CSI-RS resource 2; a transmitted beam represented by CSI-RS resource 4; a transmitted beam represented by CSI-RS resource 3; a transmitted beam represented by CSI-RS resource 7, and the 4 transmitted beams are arranged in a descending order in direction of arrow. The encoding unit 640 may determine that identification information of the 4 candidate transmitted beams is expressed by using an 8-bit bit map. That is, 8 bits of the bit map correspond to transmitted beams represented by CSI-RS resource 0 to 7 respectively. Then the bit map as shown in FIG. 9 may be determined, such that the encoding unit 640 may determine that the report information is expressed by 00111001. The information about the N candidate transmitted beams as shown in FIG. 9 only includes identification information of the N candidate transmitted beams without order information of the N candidate transmitted beams. That is, a network side device does not know the order information of the N candidate transmitted beams when decoding the information of the N candidate transmitted beams.

According to an embodiment of the present disclosure, the encoding unit 640 may express the identification of a reference candidate transmitted beam in the N candidate transmitted beams by using the binary coding, and express the identification of other candidate transmitted beams in addition to the reference candidate transmitted beam in the N candidate transmitted beams by using binary coding of a difference value between identifications of other candidate transmitted beams and the reference candidate transmitted beam. The encoding unit 640 may select a candidate transmitted beam closest to an intermediate position of all transmitted beams as a reference candidate transmitted beam, and express die identification of the reference candidate transmitted beam by using the binary coding. The identification of other candidate transmitted beams is expressed by using binary coding of a difference value between identifications of other candidate transmitted beams and the reference candidate transmitted beam. Further, the encoding unit 640 may determine whether the difference value between identifications of other candidate transmitted beams and the reference candidate transmitted beam is positive or negative, based on an encoding order of identifications of other candidate transmitted beams and the reference candidate transmitted beam. For example, the encoding unit 640 may determine a difference value between identifications of the reference candidate transmitted beam and candidate transmitted beam that is encoded before the identification of the reference candidate transmitted beam is negative, and may determine a difference value between identifications of the reference candidate transmitted beam and candidate transmitted beam that is encoded after the identification of the reference candidate transmitted beam is positive.

Figure 10:
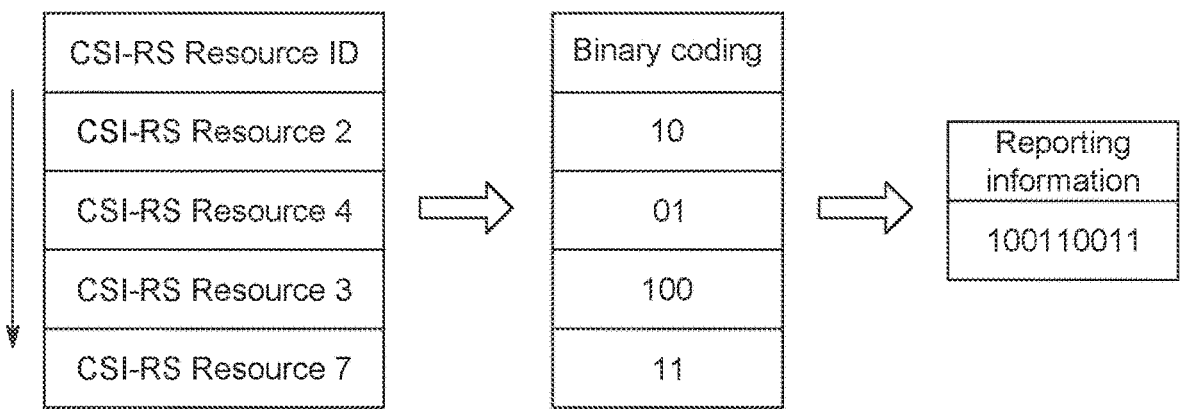
FIG. 10 is a schematic diagram showing a third method for reporting candidate transmitted beams according to an embodiment of the present disclosure.

FIG. 10 is a schematic diagram showing a third method for reporting candidate transmitted beams according to an embodiment of the present disclosure. As shown in FIG. 10, it is still assumed that K=8, N=4, and the selecting unit 630 selects 4 transmitted beams from 8 transmitted beams (CSI-RS resource 0 to 7), including: a transmitted beam represented by CSI-RS resource 2; a transmitted beam represented by CSI-RS resource 4; a transmitted beam represented by CSI-RS resource 3; a transmitted beam represented by CSI-RS resource 1, and the 4 transmitted beams are arranged in a descending order in direction of arrow. Since the candidate transmitted beam represented by the CSI-RS resource 3 and the candidate transmitted beam represented by the CSI-RS resource 4 are located in an intermediate position of the 8 candidate transmitted beams, the candidate transmitted beam represented by the CSI-RS resource 3 or the candidate transmitted beam represented by the CSI-RS resource 4 may be selected as a reference candidate transmitted beam. In FIG. 10, the candidate transmitted beam represented by the CSI-RS resource 4 is selected as the reference candidate transmitted beam. As shown in FIG. 10, the encoding unit 640 represents identification information of the candidate transmitted beam represented by the CSI-RS resource 4 by using binary coding 100. Next, the encoding unit 640 calculates that a difference value between the CSI-RS resource 2 and the CSI-RS resource 4 is 2 and is negative, and therefore, identification information of the candidate transmitted beam represented by the CSI-RS resource 2 is expressed by 10 and the identification information should be encoded before identification information of the reference candidate transmitted beam. Similarly, the encoding unit 640 calculates that a difference value between the CSI-RS resource 3 and the CSI-RS resource 4 is 1 and is negative, and therefore, identification information of the candidate transmitted beam represented by the CSI-RS resource 3 is expressed by 01 and the identification information should be encoded before the identification information of the reference candidate transmitted beam. The encoding unit 640 calculates that a difference value between the CSI-RS resource 7 and the CSI-RS resource 4 is 3 and is positive, and therefore, identification information of the candidate transmitted beam represented by the CSI-RS resource 7 is expressed by 11 and the identification information should be encoded after the identification information of the reference candidate transmitted beam. As shown in FIG. 10, the information about the N candidate transmitted beams that is finally determined by the encoding unit 640 is expressed by 100110011. The information about the N candidate transmitted beams as shown in FIG. 10 only includes the identical information about the N candidate transmitted beams without order information of the N candidate transmitted beams. Thai is, a network side device does not know the order information of the N candidate transmitted beams when decoding the information of the N candidate transmitted beams. Further, since the identification of the reference candidate transmitted beam is one bit more than that of identifications of other candidate transmitted beams, the network side device may determine a reference candidate transmitted beam when receiving the information of the N candidate transmitted beams, and may determine whether the difference value is positive or negative based on a context between other candidate transmitted beams and the reference candidate transmitted beam, thereby decoding identifications of all candidate transmitted beams.

According to an embodiment of the present disclosure, the encoding unit 640 may further be configured such that the bits of identification of the reference candidate transmitted beam are more than the bits of identifications of other candidate transmitted beams in addition to the reference candidate transmitted beam. Further, the encoding unit 640 may implement the above effect by performing zero padding before the binary coding of the identification of the reference candidate transmitted beam. That is, if the encoding unit 640 determines that the bits of identification of the reference candidate transmitted beam are the same as the bits of the identifications of oilier candidate transmitted beams, the encoding unit 640 may perform zero padding before the binary coding of the identification of the reference candidate transmitted beam, such that the bits of the identification of the reference candidate transmitted beam are more than the bits of the identifications of other candidate transmitted beams.

According to an embodiment of the present disclosure, as shown in FIG. 6, the electronic equipment 600 may further include a storage unit 650 configured to store a first mapping table, which stores a mapping relation between the combination of the N candidate transmitted beams selected from the K transmitted beams of the network side device and the combination identification. Further, a storage unit of the network side device may also store the first mapping table. The first mapping table may be stored in advance in the storage unit of the electronic equipment 600 and the storage unit of the network side device. Furthermore, the first mapping table may be established by the network side device and transmitted to the electronic equipment 600 through a high-level signaling, including but not limited to an RRC signaling.

Figures 11A, 11B:
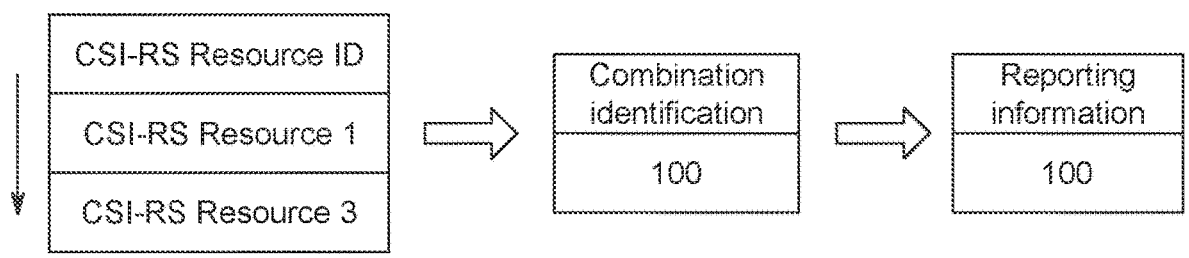
FIG. 11(a) is a schematic diagram showing a first mapping table according to an embodiment of the present disclosure.
FIG. 11(b) is a schematic diagram showing a fourth method for reporting candidate transmitted beams according to an embodiment of the present disclosure.

FIG. 11(*a*) is a schematic diagram showing a first mapping table according to an embodiment of the present disclosure. FIG. 11(*a*) shows a case that K=4 and N=2. That is, the electronic equipment 600 needs to select 2 candidate transmitted beams from 4 transmitted beams (CSI resource 0 to 3). The left side of FIG. 11(*a*) shows all combinations of the 2 candidate transmitted beams selected from the 4 transmitted beams and the right side of FIG. 11(*a*) shows combination identifications corresponding to the combinations. For example, 1100 shown in the left side expresses that a transmitted beam represented by the CSI-RS resource 0 and a transmitted beam represented by the CSI-RS resource 1 are selected, and a combination identification corresponding to this combination is expressed by 000. Bits required by combination identifications may be determined based on the total number of the combinations. For example, the total number of the combinations is calculated to be 6 according to a formula $C_4^2$, to determine that 3 bits are required to express the combination identifications.

According to an embodiment of the present disclosure, the encoding unit 640 may determine combination identification corresponding to the combination based on a first mapping table and an unordered combination of the N candidate transmitted beams, and express the identification of the N candidate transmitted beams by using the combination identification.

FIG. 11(*b*) is a schematic diagram showing a fourth method for reporting candidate transmitted beams according to an embodiment of the present disclosure. As shown in FIG. 11(*b*), it is assumed that K=4 and N=2. The selecting unit 630 selects 2 transmitted beams from 4 transmitted beams, including: a transmitted beam represented by CSI-RS resource 1 and a transmitted beam represented by CSI-RS resource 3, and the 2 transmitted beams are arranged in a descending order in direction of arrow. According to an embodiment of the present disclosure, the encoding unit 640 may determine that an unordered combination of the transmitted beam represented by the CSI-RS resource 1 and the transmitted beam represented by the CSI-RS resource 3 is expressed by 0101 as shown in FIG. 11(*a*), thereby determining that a combination identification corresponding to the unordered combination is expressed by 100. Thus, the encoding unit 640 may determine that information about the N candidate transmitted beams is expressed by 100. The information about the N candidate transmitted beams as shown in FIG. 11(*b*) only includes identification information of the N candidate transmitted beams without order information of the N candidate transmitted beams. That is, a network side device does not know the order information of the N candidate transmitted beams when decoding the information about the N candidate transmitted beams. Furthermore, the network side device may determine identifications of the N candidate transmitted beams based on a first mapping table stored in advance when receiving such information.

According to an embodiment of the present disclosure, the storage unit 650 may also store a second mapping table, which stores a mapping relation between an arrangement of N candidate transmitted beams selected from the K transmitted beams of the network side device and arrangement identification. Further, a storage unit of the network side device may also store the second mapping table. The second mapping table may be stored in advance in the storage unit of the electronic equipment 600 and the storage unit of the network side device. Furthermore, the second mapping table may be established by the network side device and transmitted to the electronic equipment 600 through a high-level signaling, including but not limited to an RRC signaling.

FIG. 12(*a*) is a schematic diagram showing a second mapping table according to an embodiment of the present disclosure. FIG. 12(*a*) show's a case that K=4 and N=2. That is, the electronic equipment 600 needs to select an ordered arrangement of 2 candidate transmitted beams from 4 transmitted beams (CSI resource 0 to 3). The left side of FIG.

Figures 12A, 12B:
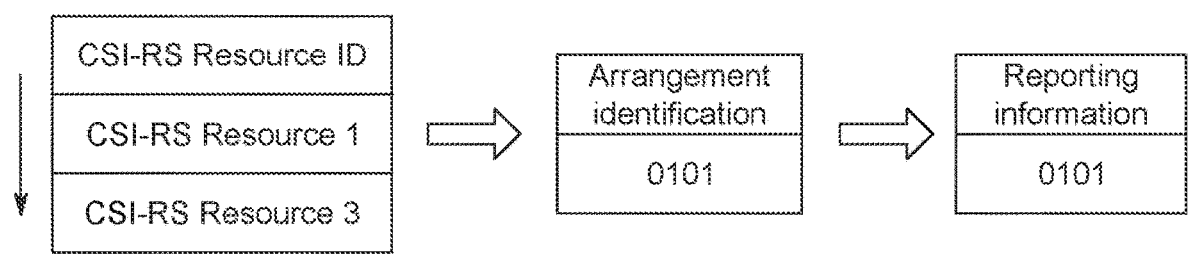
FIG. 12(a) is a schematic diagram showing a second mapping table according to an embodiment of the present disclosure.
FIG. 12(b) is a schematic diagram showing a fifth method for reporting candidate transmitted beams according to an embodiment of the present disclosure.

12(a) shows all arrangements of 2 candidate transmitted beams selected from the 4 transmitted beams, and the Tight side of FIG. 12(a) shows arrangement identifications corresponding to the arrangements. For example, 0001 shown in the left side expresses that a transmitted beam represented by CSI-RS resource 0 and a transmitted beam represented by CSI-RS resource 1 are selected, and the transmitted beam represented by the CSI-RS resource 0 and the transmitted beam represented by the CSI-RS resource 1 are arranged in a descending order, and arrangement identification corresponding to this arrangement is expressed by 0000. As another example, 0010 shown in the left side expresses that a transmitted beam represented by the CSI-RS resource 0 and a transmitted beam represented by CSI-RS resource 2 are selected, and the transmitted beam represented by the CSI-RS resource 0 and the transmitted beam represented by the CSI-RS resource 2 are arranged in a descending order, and arrangement identification corresponding to this arrangement is expressed by 0001. Bits required by arrangement identifications may be determined based on the total number of arrangements. For example, the total number of the arrangements is calculated to be 12 according to a formula $A_4^2$, to determine that 4 bits are required to express the arrangement identifications.

According to an embodiment of the present disclosure, the encoding unit 640 may determine arrangement identification corresponding to the arrangement based on the second mapping table and an ordered arrangement of the N candidate transmitted beams, and express identification and order of the N candidate transmitted beams by using the arrangement identification.

FIG. 12(b) is a schematic diagram showing a fifth method for reporting candidate transmitted beams according to an embodiment of the present disclosure. As shown in FIG. 12(b), it is assumed that K=4 and N=2. The selecting unit 630 selects 2 transmitted beams from 4 transmitted beams, including: a transmitted beam represented by CSI-RS resource 1 and a transmitted beam represented by CSI-RS resource 3, and the 2 transmitted beams are arranged in a descending order in direction of arrow. According to an embodiment of the present disclosure, the encoding unit 640 may determine that an ordered arrangement of the transmitted beam represented by the CSI-RS resource 1 and the transmitted beam represented by the CSI-RS resource 3 is expressed by 01,11 shown in FIG. 12(a), thereby determining that arrangement identification corresponding to this arrangement is expressed by 0101. Thus, the encoding unit 640 may determine that information about the N candidate transmitted beams is expressed by 0101. The information about the N candidate transmitted beams shown in FIG. 12(b) includes not only identification information of the N candidate transmitted beams, but also order information of the Ni candidate transmitted beams. That is, the network side device knows the order information of the N candidate transmitted beams when decoding the information about the N candidate transmitted beams. Furthermore, the network side device may determine identification and order of the N candidate transmitted beams based on a second mapping table stored in advance when receiving such information.

As described above. FIG. 8. FIG. 9, FIG. 10, FIG. 11(b) and FIG. 12(b) show five methods for reporting candidate transmitted beams according to an embodiment of the present disclosure, respectively. Among these reporting methods, only a method for decoding identifications of the N candidate transmitted beams is shown, and a method for decoding channel quality information is not shown. Further, in a case that the information about the N candidate transmitted beams includes channel quality information between all or a part of candidate transmitted beams and the electronic equipment 600, the encoding unit 640 may encode the channel quality information according to any one of methods well-known in the art, and may add an encoding of the channel quality information between the candidate transmitted beams and the electronic equipment 600, which is not described in detail in the present disclosure.

As described above, the selecting unit 630 may select N candidate transmitted beams, and the encoding unit 640 may encode information about the N candidate transmitted beams. Further, according to an embodiment of the present disclosure, the selecting unit 630 may also select less than N candidate transmitted beams. For example, after selecting N candidate transmitted beams, the selecting unit 630 may also determine that whether a second channel quality parameter between the N candidate transmitted beams and the electronic equipment 600 meets a condition defined by a second channel quality parameter threshold (for example, the second channel quality parameter is greater than or less than the second channel quality parameter threshold, which depends on a specific representation of the second channel quality parameter. For example, in a case that the second channel quality parameter is the RSRP or the RSRQ, the second channel quality parameter need to be greater than the second channel quality parameter threshold, and in a case that the second channel quality parameter is the BLER, the second channel quality parameter need to be less than the second channel quality parameter threshold). Further, the selecting unit 630 may remove candidate transmitted beams which do not meet the condition defined by the second channel quality parameter threshold from the N candidate transmitted beams. In the above embodiment, if candidate transmitted beams selected by the selecting unit 630 is less than N, the encoding unit 640 may select the first reporting method, the second reporting method and the third reporting method to report the candidate transmitted beams. Further, in the first reporting method and the second reporting method, the encoding unit 640 may encode identification information of the removed candidate transmitted beam as 0. For example, it is assumed that a second channel quality parameter of a transmitted beam represented by CSI-RS resource 7 does not meet the condition defined by the second channel quality parameter threshold, in an example shown in FIG. 8, reported information may be expressed by 0101000110; in an example shown in FIG. 9, reported information may be expressed by 00111000; and in an example shown in FIG. 10, reported information may be expressed by 10011000.

According to an embodiment of the present disclosure, the selecting unit 630 may select N candidate transmitted beams further based on the second channel quality parameter threshold, such that candidate transmitted beams with poor channel quality parameter are removed, thereby further reducing overhead.

According to an embodiment of the present disclosure, the communication unit 610 may receive configuration information about the number of the N candidate transmitted beams from the network side device, for example, through a high-level signaling (which includes but not limited to an RRC signaling). Furthermore, the communication unit 610 may also send a request to the network side device to request to reconfigure the number of N, and may receive reconfiguration information about the number of the N candidate transmitted beams from the network side device, for example, through a low-level signaling (which includes but not limited to DCI).

According to an embodiment of the present disclosure, the communication unit 610 may also receive configuration information of reporting methods from the network side device, for example, through a high-level signaling (which includes but not limited to an RRC signaling). One of the five reporting methods may be expressed by 3 bits. Furthermore, the communication unit 610 may also send a request to the network side device to request to reconfigure the reporting method, and receive reconfiguration information of the reporting method from the network side device, for example, through a low-level signaling (which includes but not limited to DCI).

Table 1 shows overhead required by the above five methods, the unit of numbers in the table is number of bits. For the fourth method and the fifth method, only the number of bits required in a case of reporting the N candidate transmitted beams is shown, and the number of bits required to store the first mapping table and the second mapping table is not shown. Furthermore. Table 1 only shows a case that K=[4, 8, 16, 32, 64] and N=[1, 2, 4, 8] where K is greater than or equal to N.

TABLE 1

|  | The first method (ordered) | The fifth method (ordered) | The third method (unordered) | The second method (unordered) | The fourth method (unordered) |
|---|---|---|---|---|---|
| K = 4, N = 1 | 2 | 2 | 2 | 4 | 2 |
| K = 4, N = 2 | 4 | 4 | 3~4 | 4 | 3 |
| K = 4, N = 4 | 8 | 5 | 6 | 4 | 1 |
| K = 8, N = 1 | 3 | 3 | 3 | 8 | 3 |
| K = 8, N = 2 | 6 | 6 | 4~6 | 8 | 5 |
| K = 8, N = 4 | 12 | 11 | 9~10 | 8 | 7 |
| K = 8, N = 8 | 24 | 16 | 13 | 8 | 1 |
| K = 16, N = 1 | 4 | 4 | 4 | 16 | 4 |
| K = 16, N = 2 | 8 | 8 | 5~8 | 16 | 7 |
| K = 16, N = 4 | 16 | 16 | 8~13 | 16 | 11 |
| K = 16, N = 8 | 32 | 29 | 17~25 | 16 | 14 |
| K = 32, N = 1 | 5 | 5 | 5 | 32 | 5 |
| K = 32, N = 2 | 10 | 10 | 6~10 | 32 | 9 |
| K = 32, N = 4 | 20 | 20 | 9~17 | 32 | 16 |
| K = 32, N = 8 | 40 | 39 | 18~33 | 32 | 24 |
| K = 64, N = 1 | 6 | 6 | 6 | 64 | 6 |
| K = 64, N = 2 | 12 | 12 | 7~12 | 64 | 11 |
| K = 64, N = 4 | 24 | 24 | 10~21 | 64 | 20 |
| K = 64, N = 8 | 48 | 48 | 19~41 | 64 | 33 |

According to an embodiment of the present disclosure, the network side device may select a reporting method based on values of K and N, to reduce overhead required for reporting. In an embodiment, in a case that N/K≥0.5 and K>16, the second method may be selected; in a case that K=N, the fourth method may be selected; in a case that N≥8, K≥16 and N/K<0.5, the third method may be selected; and in a case that N≤4 and K≤16, the fourth method may be selected. Alternatively, the above-described embodiment is only exemplary, and the network side device may select a reporting method according to actual situations.

According to an embodiment of the present disclosure, the electronic equipment 600 may periodically transmit the information about die N candidate transmitted beams to the network side device. Further, the electronic equipment 600 may also transmit the information about the N candidate transmitted beams in response to a request of the network side device. That is, the electronic equipment 600 transmits the information about the N candidate transmitted beams to the network side device when receiving a request of the network side device.

According to an embodiment of the present disclosure, the electronic equipment 600 may receive, from the network side device, configuration information of contents in the information of the N candidate transmuted beams, for example, through a low-level signaling (which includes but not limited to DCI), which includes the full report, the partial report and the hybrid report. The full report represents that the identification information of the N candidate transmitted beams and the channel quality information between each of the N candidate transmitted beams and the electronic equipment 600 are required to be reported, as shown in FIG. 3(b). The partial report represents that only the identification information of the N candidate transmitted beams is required to be reported, as shown in FIG. 3(a). The hybrid report represents that the identification information of the N candidate transmitted beams and maximum and minimum values of the channel quality information between the N candidate transmitted beams and the electronic equipment 600 are required to be reported, as shown in FIG. 3(c).

That is, the network side device may configure contents, triggering modes and reporting methods included in the information about the N candidate transmitted beams. Furthermore, in order to further reduce overhead for reporting, the network side device may also configure the above information based on a certain criterion. For example, in a case that the partial report is configured for the electronic equipment 600, only the first reporting method and the fifth reporting method (that is, the ordered reporting method) may be adopted; and in a case that the full report and the hybrid report are configured for the electronic equipment 600, only the second reporting method, the third reporting method and the fourth reporting method (that is, the unordered reporting method) may be adopted. As another example, in a case that the periodic report is configured for the electronic equipment 600, a manner of the partial report may be configured for the electronic equipment 600; and in a case that the event report is configured for the electronic equipment 600, a manner of the full report and the hybrid report may be configured for the electronic equipment 600. In this case, the electronic equipment 600 may receive, from the network side device, indicating information indicating the full report or the hybrid report, for example, indicating by using 1-bit information. Further, in a case that the third reporting method is configured for the electronic equipment 600, a manner of the full report method may be configured for the electronic equipment 600. Alternatively, the above criteria are only exemplary preferred manner and have no limiting effect.

Table 2 shows preferred manners of configuring, by the network side device, reporting information for the electronic equipment 600.

TABLE 2

| Reporting method | Triggering mode | Reporting content |
| --- | --- | --- |
| First method (ordered) | Periodic | Partial report |
| Second method (unordered) | Event | Full report or hybrid report |
| Third method (unordered) | Event | Full report |
| Fourth method (unordered) | Event | Full report or hybrid report |
| Fifth method (ordered) | Periodic | Partial report |

Figure 13:
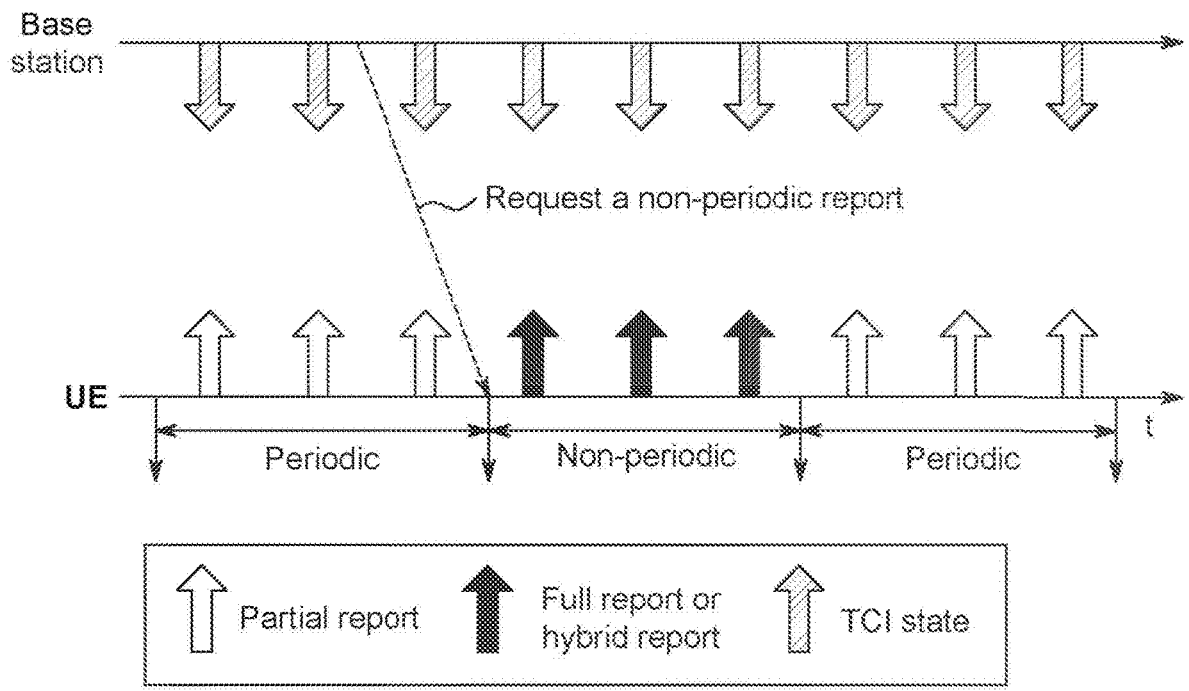
FIG. 13 is a schematic diagram showing a process for reporting candidate transmitted beams according to an embodiment of the present disclosure.

FIG. 13 is a schematic diagram showing a process for reporting candidate transmitted beams according to an embodiment of the present disclosure. As shown in FIG. 13, a UE periodically report information of N candidate transmitted beams to a base station in a partial report manner, such that the base station transmits a TCI state to the UE. The base station may also transmit an indication for requesting a non-periodic report to the UE. For example, 1 bit may be used to indicate whether the full reporting manner or the hybrid reporting manner is used, and the UE may report the information about the N candidate transmitted beams to the base station in the full reporting manner or the hybrid reporting manner in response to such indication. As described above. FIG. 13 only shows an exemplary embodiment regarding report, which is not limiting.

A process in which the electronic equipment 600 reports the information about the N candidate transmitted beams to the network side device is described in detail above. How the electronic equipment 600 determines an appropriate received beam based on the received TCI state is described in detail below.

According to an embodiment of the present disclosure, the determining unit 620 may determine, based on a mapping relation between the TCI slate and a beam for transmitting a Synchronization Signal Block SSB, a beam for transmitting the SSB.

According to an embodiment of the present disclosure, the communication unit 610 may receive, after an initial access is completed, from tire network side device the mapping relation between the TCI state and the beam for transmitting the SSB. Further, the electronic equipment 600 may store the mapping relation between the TCI state and die beam for transmitting the SSB in the storage unit 650. The mapping relation between the TCI state and the beam for transmitting the SSB is established by the network side device, as shown in above FIG. 4, which is not repeated herein. For example, the electronic equipment 600 may determine a beam for transmitting the SSB represented by SSB resource ID5 based on the mapping relation shown in FIG. 4 when receiving a TCI state of 100.

According to an embodiment of the present disclosure, the determining unit 620 may determine a received beam for receiving downlink information from the network side device based on a mapping relation between the beam for transmitting the SSB and the received beam.

As shown in FIG. 6, the electronic equipment 600 may include a establishing unit 660 configured to establish, in the process of initial access, the mapping relation between the beam for transmitting the SSB and the received beam. Also, the beam for transmitting the SSB may be represented by resource identification information of the SSB. During the process of initial access, the network side device may transmit the SSB to the electronic equipment 600, and the electronic equipment 600 uses the received beam to receive the SSB transmitted by the network side device, and may record which received bean) is used to receive which beam for transmitting the SSB, so as to gradually establish a mapping relation between the received beam and the beam for transmitting the SSB. Further, the electronic equipment 600 may store the mapping relation between the beam for transmitting the SSB and the received beam in the storage unit. For example, the electronic equipment 600 may determine the beam for transmitting the SSB represented by the SSB resource ID5 based on the mapping relation shown in FIG. 4 when receiving a TCI state of 100, and may determine the corresponding received beam based on the mapping relation between the beam for transmitting the SSB and the received beam.

Figure 14:
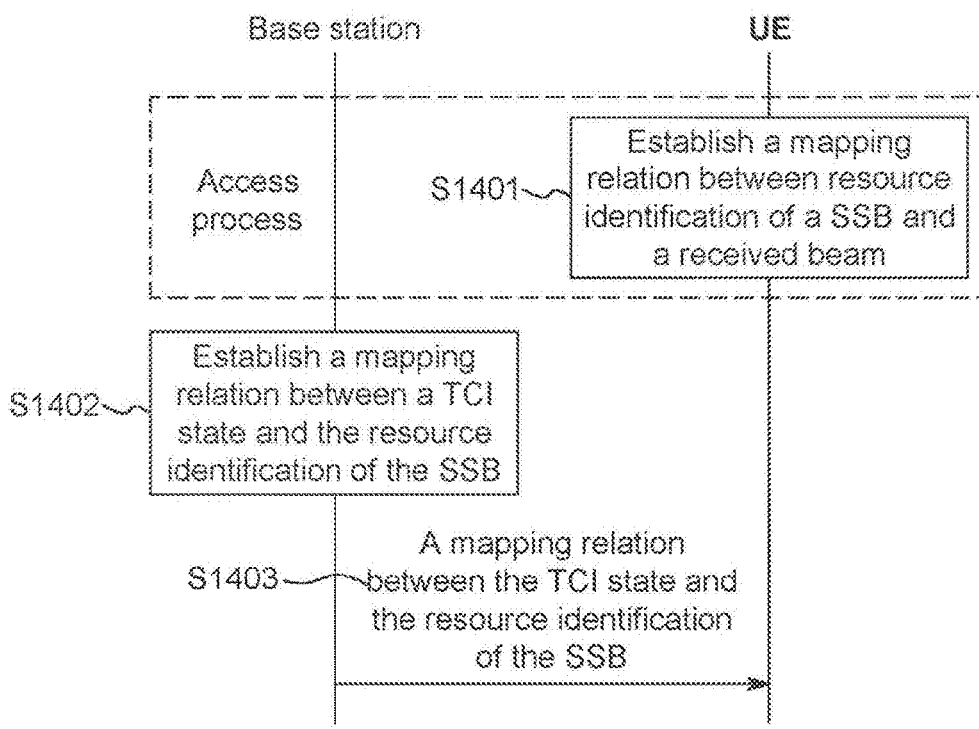
FIG. 14 is a signaling flowchart showing that a user equipment obtains a mapping relation between resource identification information of a SSB and a received beam and a mapping relation between a TCI state and resource identification information of the SSB according to an embodiment of the present disclosure.

FIG. 14 is a signaling flowchart showing that a user equipment obtains a mapping relation between resource identification information of a SSB and a received beam and a mapping relation between a TCI state and resource identification information of the SSB according to an embodiment of the present disclosure. In FIG. 14, a beam for transmitting the SSB is represented by the resource identification of the SSB. As shown in FIG. 14, in step S1401, a UE establishes a mapping relation between the resource identification of the SSB and a received beam during the process of access. Next, in step S1402, after the process of access is completed, a base station establishes a mapping relation between the TCI state and the resource identification of the SSB. Next, in step S1403, the base station transmits the mapping relation between the TCI slate and the resource identification of the SSB to the UE. Thus, the UE obtains and stores the mapping relation between the TCI state and the resource identification of the SSB and the mapping relation between the resource identification of the SSB and the received beam.

As described above, the electronic equipment 600 according to an embodiment of the present disclosure may receive, from the network side device, a TCI state which is related to a transmitted beam selected by the network side device, and therefore, the electronic equipment 600 may determine an appropriate received beam based on the TCI state, such that the determined received beam matches the transmitted beam of the network side device, thereby implementing beamforming, and thus improving a system gain.

The electronic equipment 200 according to embodiments of the present disclosure may serve as a network side device and the electronic equipment 600 may serve as a user equipment. That is, the electronic equipment 200 may provide services for the electronic equipment 600. Therefore, all of the embodiments with respect to the electronic equipment 200 described above are applicable thereto.

<4. Method Embodiments>

Below a wireless communication performed by the electronic equipment 200 which serves as a network side device in a wireless communication system according to embodiments of the present disclosure will be described in detail.

Figure 15:
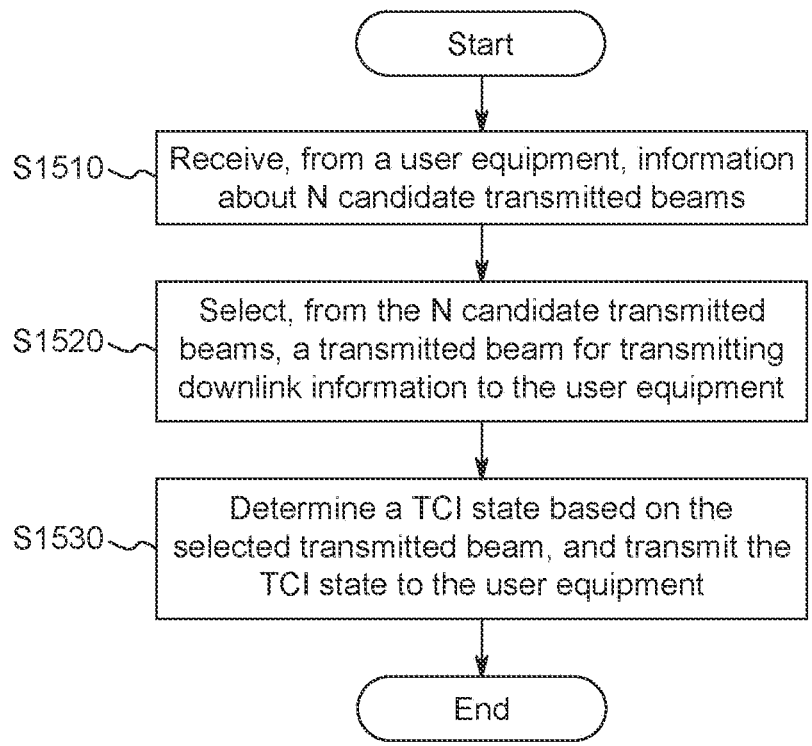
FIG. 15 is a flowchart showing a wireless communication method performed by an electronic equipment according to an embodiment of the present disclosure.

FIG. 15 is a flowchart showing a wireless communication method performed by the electronic equipment 200 which serves as a network side device in a wireless communication system according to an embodiment of the present disclosure.

As shown in FIG. 15, in step S1510, information about N candidate transmitted beams is received from a user equipment, where N is an integer greater than 1.

Next, in step S1520, a transmitted beam for transmitting downlink information to the user equipment is selected from the N candidate transmitted beams.

Next, in step S1530, a Transmission Configuration Indication TCI state is determined based on the selected transmitted beam, and the TCI state is transmitted to the user equipment.

In an embodiment, the method further includes: determining identification information of the N candidate transmitted beams based on the information about the N candidate transmitted beams.

In an embodiment, the method further includes, determining order information of the N candidate transmitted beams based on the information about the N candidate transmitted beams; and selecting a transmitted beam for transmitting downlink information to the user equipment based on the order information of the N candidate transmitted beams.

In an embodiment, the method further includes: determining channel quality information between all or a part of candidate transmitted beams in the N candidate transmitted beams and the user equipment based on the information about the N candidate transmitted beams; and selecting a transmitted beam for transmitting downlink information to the user equipment based on the channel quality information between the all or a part of candidate transmitted beams and the user equipment.

In an embodiment, determining a Transmission Configuration Indication TCI state based on the selected transmitted beam includes: determining a beam for transmitting a Synchronization Signal Block SSB corresponding to the selected transmitted beam; and determining a TCI slate to be transmitted to the user equipment based on a mapping relation between the TCI state and the beam for transmitting the SSB.

In an embodiment, determining a beam for transmitting a Synchronization Signal Block SSB corresponding to the selected transmitted beam includes: causing that a radiation range of the selected transmitted beam is within a radiation range of the beam for transmitting the SSB corresponding to the selected transmitted beam.

In an embodiment, the method further includes: after an initial access is completed, establishing a mapping relation between the TCI slate and the beam for transmitting the SSB; and transmitting, to the user equipment, the mapping relation between the TCI state and the beam for transmitting the SSB.

In an embodiment, the method further includes, periodically receiving, from the user equipment, the information about the N candidate transmitted beams, or sending a request to the user equipment to obtain the information about the N candidate transmitted beams.

In an embodiment, the electronic equipment 200 includes a network side device in a New Radio NR communication system.

According to an embodiment of the present disclosure, the main body performing the above method may be die electronic equipment 200 according to an embodiment of the present disclosure, and thus all of the embodiments described above with respect to the electronic equipment 200 are applicable thereto.

Below a wireless communication performed by the electronic equipment 600 which serves as a user equipment in a wireless communication system according to embodiments of the present disclosure will be described in detail.

Figure 16:
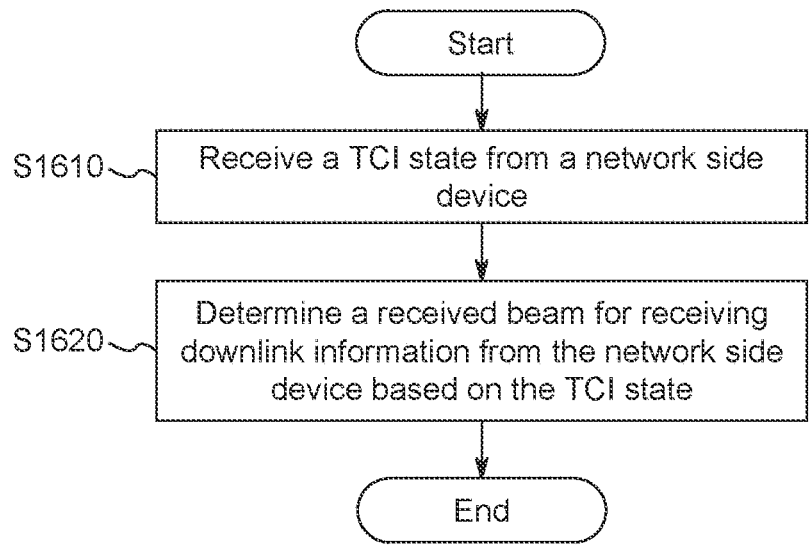
FIG. 16 is a flowchart showing a wireless communication method performed by an electronic equipment according to another embodiment of the present disclosure.

FIG. 16 is a flowchart showing a wireless communication method performed by the electronic equipment 600 which serves as a user equipment in a wireless communication system according to an embodiment of the present disclosure.

As shown in FIG. 16, in step S1610, a Transmission Configuration Indication TCI state is received from a network side device.

Next, in step S1620, a received beam for receiving downlink information from the network side device is determined based on the TCI state.

In an embodiment, the method further includes: transmitting, to the network side device, information about N candidate transmitted beams for selecting, by the network side device, a transmitted beam for transmitting downlink information to the electronic equipment 600 from the N candidate transmitted beams, and determine the TCI state based on the selected transmitted beam, where N is an integer greater than 1.

In an embodiment, the method further includes, determining the N candidate transmitted beams based on channel quality between K transmitted beams of the network side device and the electronic equipment 600, where K is an integer greater than or equal to N.

In an embodiment, the method further includes: determining the channel quality based on one or more of parameters including Reference Signal Receiving Power RSRP, Reference Signal Receiving Quality RSRQ, and Block Error Rate BLER.

In an embodiment, the method further includes, periodically transmitting the information about the N candidate transmitted beams to the network side device; or transmitting the information about the N candidate transmitted beams in response to a request of the network side device.

In an embodiment, the information about the N candidate transmitted beams includes identification information of the N candidate transmitted beams.

In an embodiment, the method further includes: expressing the identification of each of the N candidate transmitted beams by using binary coding.

In an embodiment, the method further includes: expressing the identification of the N candidate transmitted beams by using a bit map.

In an embodiment, the method further includes: expressing the identification of a reference candidate transmitted beam in the N candidate transmitted beams by using the binary coding, and expressing the identification of other candidate transmitted beams in addition to the reference candidate transmitted beam in the N candidate transmuted beams by using binary coding of a difference value between identifications of other candidate transmitted beams and the reference candidate transmitted beam.

In an embodiment, the method further includes: based on a first mapping table and an unordered combination of the N candidate transmitted beams, determining combination identification corresponding to the combination, and expressing the identification of the N candidate transmitted beams by using the combination identification, where the first mapping table stores a mapping relation between the combination of the N candidate transmitted beams selected from the K transmitted beams of the network side device and the combination identification, where K is an integer greater than or equal to N.

In an embodiment, the method further includes: the information about the N candidate transmitted beams including order information of the N candidate transmitted beams.

In an embodiment, the method further includes: based on a second mapping table and an ordered arrangement of the N candidate transmitted beams, determining arrangement identification corresponding to the arrangement; and expressing identification and order of the N candidate transmitted beams by using the arrangement identification, where the second mapping table stores a mapping relation between the arrangement of the N candidate transmitted beams selected from the K transmitted beams of the network side device and the arrangement identification, where K is an integer greater than or equal to N.

In an embodiment, the information about the N candidate transmitted beams includes channel quality information between all or a part of candidate transmitted beams in the N candidate transmitted beams and the electronic equipment 600.

In an embodiment, determining a received beam for receiving downlink information from the network side device based on the TCI state includes: determining, based on a mapping relation between the TCI state and a beam for transmitting a Synchronization Signal Block SSB, a beam for transmitting the SSB; and determining a received beam for receiving downlink information from the network side device based on a mapping relation between the beam for transmitting the SSB and the received beam.

In an embodiment, the method further includes: after an initial access is completed, receiving from the network side device the mapping relation between the TCI state and the beam for transmitting the SSB.

In an embodiment, the method further includes: establishing, in the process of initial access, the mapping relation between the beam tor transmitting the SSB and the received beam.

In an embodiment, the method further includes, receiving, from the network side device, configuration information about the number of the N candidate transmitted beams.

In an embodiment, the electronic equipment 600 includes user equipment in a New Radio NR communication system.

According to an embodiment of the present disclosure, a main body performing the above method may be the electronic equipment 600 according to an embodiment of the present disclosure, and thus all of the embodiments described above with respect to the electronic equipment 600 are applicable thereto.

<5. Application Example>

The technology according to the present disclosure may be applied in various productions.

The network side device may be implemented as any type of TRPs. The TRP may provide both transmitting function and receiving function, for example, receiving information from a user equipment and a base station device and transmitting information to the user equipment and the base station device. In a typical example, the TRP may provide services to the user equipment and is controlled by the base station device. Further, the TRP may have a structure similar to that of the base stations described below, and only may have a structure related to transmitting and receiving information in the base station device.

The network side device may also be implemented as any type of base stations such as a macro eNB and a small eNB, and further be implemented as any type of gNB. The small eNB may be an eNB such as a pico eNB, a micro eNB, and a home (femto) eNB that covers a cell smaller than a macro cell. Alternatively, the base station may be implemented as any other types of base stations, such as a NodeB and a base transceiver station (BTS). The base station may include a main body (also referred to as base station device) configured to control wireless communication, and one or more remote radio heads (RRH) located at positions different from the main body.

The user equipment may be realized as a mobile terminal (such as a smart phone, a tablet personal computer (PC), a notebook PC, a portable game terminal, a portable/dongle type mobile router, and a digital camera device), or an in-vehicle terminal (such as a vehicle navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single chip) mounted on each of the above user equipments.

<Application Examples of a Base Station>

(First Application Example)

Figure 17:
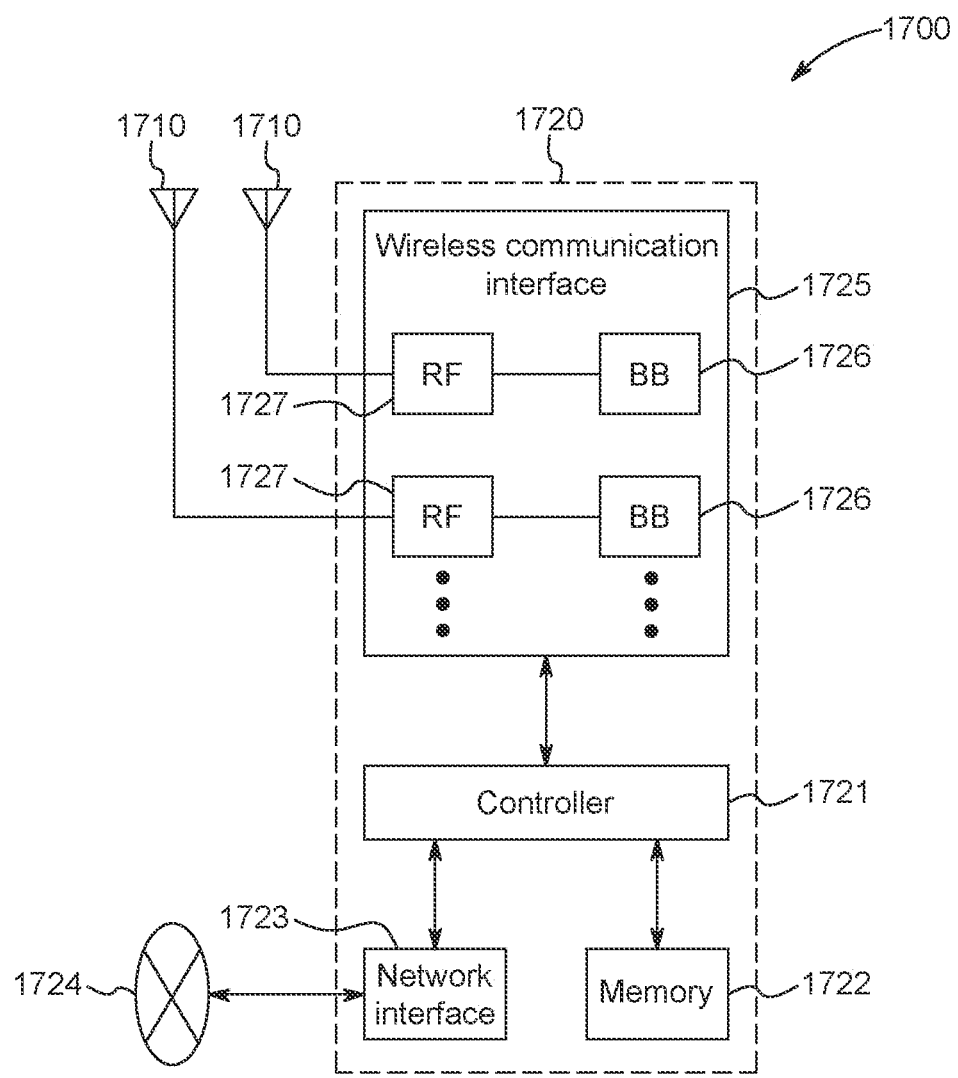
FIG. 17 is a block diagram showing a first example of a schematic configuration of an eNB (Evolved Node B)

FIG. 17 is a block diagram illustrating a first example of a schematic configuration of an eNB to which the technology of the present disclosure may be applied. An eNB 1700 includes one or more antennas 1710 and a base station device 1720. The base station device 1720 and each of the antennas 1710 may be connected to each other via an RF cable Each of the antennas 1710 includes a single antenna element or multiple antenna elements (such as multiple antenna elements included in the multiple-input multiple-output (MIMO) antenna), and is used for transmitting and receiving a radio signal by the base station device 1720. The eNB 1700 may include multiple antennas 1710, as shown in FIG. 17. For example, the multiple antennas 1710 may be compatible with multiple frequency bands used by the eNB 1700. Although FIG. 17 shows an example in which the eNB 1700 includes the multiple antennas 1710, the eNB 1700 may also include a single antenna 1710.

The base station device 1720 includes a controller 1721, a memory 1722, a network interface 1723, and a wireless communication interface 1725.

The controller 1721 may be, for example, a CPU or a DSP, and operates various functions of a higher layer of the base station device 1720. For example, die controller 1721 generates a data packet based on data in signals processed by the wireless communication interface 1725, and transfers the generated packet via the network interface 1723. The controller 1721 may bundle data from multiple base band processors to generate the bundled packet, and transfer the generated bundled packet. The controller 1721 may include logical functions of performing control such as radio resource control, radio bearer control, mobility management, admission control, and scheduling. The control may be performed in corporation with an eNB or a core network node in the vicinity. The memory 1722 includes an RAM and an ROM, and stores a program that is executed by the controller 1721, and various types of control data (such as a terminal list, transmission power data, and scheduling data).

The network interface 1723 is a communication interface for connecting the base station device 1720 to a core network 1724. The controller 1721 may communicate with a core network node or another eNB via the network interlace 1723. In that case, the eNB 1700, and the core network node or the other eNB may be connected to each other through a logical interface (such as an S1 interface and an X2 interface). The network interface 1723 may also be a wired communication interface or a w ireless communication interface for radio backhaul. If the network interface 1723 is a wireless communication interlace, the network interface 1723 may use a higher frequency band for wireless communication than a frequency band used by the wireless communication interface 1725.

The wireless communication interface 1725 supports any cellular communication schemes (such as long term evolution (LTE) and LTE-advanced), and provides a wireless connection to a terminal located in a cell of the eNB 1700 via the antenna 1710. The wireless communication interface 1725 may generally include, for example, a baseband (BB) processor 1726 and an RF circuit 1727. The BB processor 1726 may perform, for example, coding/decoding, modulation/demodulation and multiplexing de-multiplexing, and perform various types of signal processes of the layer (for example L1, medium access control (MAC), wireless link control (RLC) and packet data convergence protocol (PDCP)). Instead of the controller 1721, the BB processor 1726 may include some or all of the above logical functions. The BB processor 1726 may be a memory storing communication control programs, or a module including a processor and related circuit configured to perform the program. Updating the program may allow the functions of the BB processor 1726 to be changed. The module may be a card or a blade that is inserted into a slot of the base station device 1720. Alternatively, the module may also be a chip that is mounted on the card or the blade. In addition, die RF circuit 1727 may include, for example, a frequency mixer, a filter, and an amplifier, and transmits and receives a radio signal via the antenna 1710.

The wireless communication interface 1725 may include the multiple BB processors 1726, as shown in FIG. 17. For example, the multiple BB processors 1726 may be compatible with multiple frequency bands used by the eNB 1700. The wireless communication interface 1725 may include the multiple RF circuits 1727, as shown in FIG. 17. For example, the multiple RF circuits 1727 may be compatible with multiple antenna elements. Although FIG. 17 shows an example in which the wireless communication interface 1725 includes multiple BB processors 1726 and multiple RF circuits 1727, the wireless communication interface 1725 may include a single BB processor 1726 or a single RF circuit 1727.

(Second Application Example)

Figure 18:
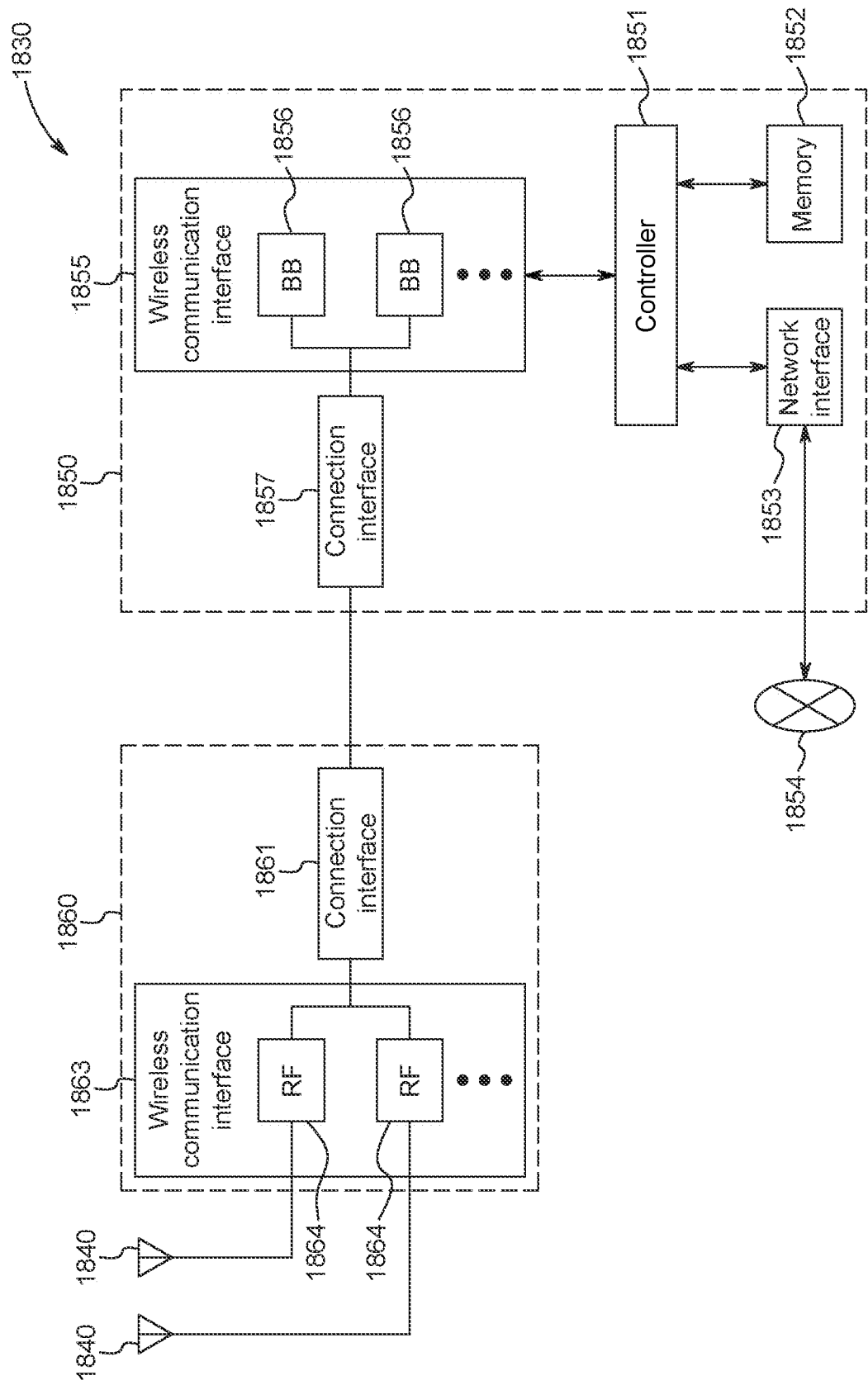
FIG. 18 is a block diagram showing a second example of a schematic configuration of an eNB.

FIG. 18 is a block diagram showing a second example of a schematic configuration of an eNB to which the technology of the present disclosure may be applied. An eNB 1830 includes one or more antennas 1840, a base station device 1850 and an RRH 1860. The RRH 1860 and each of the antennas 1840 may be connected to each other via an RF cable. The base station device 1850 and the RRH 1860 may be connected to each other via a high speed line such as an optical fiber cable.

Each of the antennas 1840 includes a single antenna element or multiple antenna elements (such as multiple antenna elements included in an MIMO antenna), and is used for transmitting and receiving a radio signal by the RRH 1860. As shown in FIG. 18, the eNB 1830 may include multiple antennas 1840. For example, the multiple antennas 1840 may be compatible with multiple frequency bands used by the eNB 1830. Although FIG. 18 shows an example in which the eNB 1830 includes the multiple antennas 1840, the eNB 1830 may also include a single antenna 1840.

The base station device 1850 includes a controller 1851, a memory 1852, a network interface 1853, a wireless communication interface 1855, and a connection interface 1857. The controller 1851, the memory 1852, and the network interface 1853 are the same as the controller 1721, the memory 1722, and the network interface 1723 described with reference to FIG. 17.

The wireless communication interface 1855 supports any cellular communication schemes (such as the LTE and the LTE-advanced), and provides a wireless connection to a terminal located in the a sector corresponding to the RRH 1860 via the RRH 1860 and the antenna 1840. The wireless communication interface 1855 may generally include, for example, a baseband (BB) processor 1856. Except for the BB processor 1856 being connected to a RF circuit 1864 of the RRH 1860 via the connection interface 1857, the BB processor 1856 is the same as the BB processor 1726 described with reference to FIG. 17. The wireless communication interface 1855 may include multiple BB processors 1856, as shown in FIG. 18. For example, the multiple BB processors 1856 may be compatible with multiple frequency bands used by the eNB 1830. Although FIG. 18 shows an example in which the wireless communication interface 1855 includes multiple BB processors 1856, the wireless communication interface 1855 may also include a single BB processor 1856.

The connection interface 1857 is an interface for connecting the base station device 1850 (wireless communication interface 1855) to the RRH 1860. The connection interface 1857 may also be a communication module for communication in the above high-speed line that connects the base station device 1850 (the wireless communication interface 1855) to the RRH 1860.

The RRH 1860 includes a connection interlace 1861 and a wireless communication interface 1863.

The connection interface 1861 is an interface for connecting the RRH 1860 (wireless communication interface 1863) to the base station device 1850. The connection interface 1861 may also be a communication module for communication in the above-described high-speed line.

The wireless communication interface 1863 transmits and receives a radio signal via the antenna 1840. The wireless communication interface 1863 may generally include, for example, the RF circuit 1864. The RF circuit 1864 may include, for example, a frequency mixer, a filter, and an amplifier, and transmits and receives a radio signal via the antenna 1840. The wireless communication interface 1863 may include multiple RF circuits 1864, as shown in FIG. 18. For example, the multiple RF circuits 1864 may support multiple antenna elements. Although FIG. 18 shows an example in which the wireless communication interface 1863 includes the multiple RF circuits 1864, the wireless communication interface 1863 may also include a single RF circuit 1864.

In the eNB 1700 and the eNB 1830 shown in FIG. 17 and FIG. 18, the selecting unit 220, the determining unit 230, the decoding unit 240, the establishing unit 250 and the storing unit 260 described with reference to FIG. 2 may be implemented by the controller 1721 and/or the controller 1851, and the communication unit 210 described with reference to FIG. 2 may be implemented by the wireless communication interface 1725 and the wireless communication interface 1855 and/or the wireless communication interface 1863. At least a part of the functions may be implemented by a controller 1721 and a controller 1851. For example, the controller 1721 and/or the controller 1851 may perform a function of selecting a transmitted beam and determining a TCI state by executing instructions stored in the corresponding memory.

\>Application Example of a Terminal Device<

(First Application Example)

Figure 19:
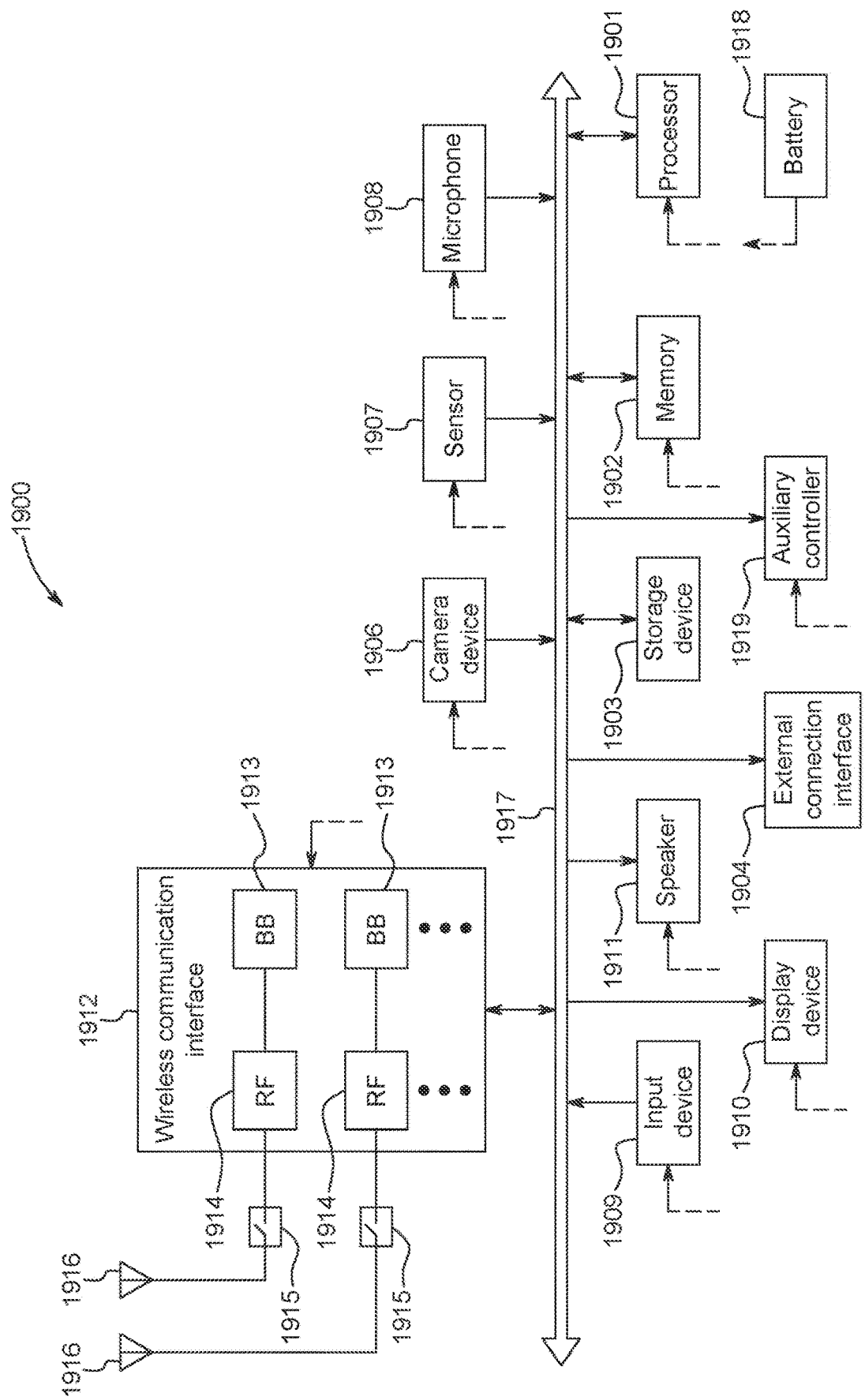
FIG. 19 is a block diagram showing an example of a schematic configuration of a smart phone.

FIG. 19 is a block diagram illustrating an example of a schematic configuration of a smart phone 1900 to which the technology of the present disclosure may be applied. The smart phone 1900 includes a processor 1901, a memory 1902, a storage device 1903, an external connection interface 1904, a camera device 1906, a sensor 1907, a microphone 1908, an input device 1909, a display device 1910, a speaker 1911, a wireless communication interface 1912, one or more antenna switches 1915, one or more antennas 1916, a bus 1917, a battery 1918 and an auxiliary controller 1919.

The processor 1901 may be, for example, a CPU or a system on chip (SoC), and controls functions of application layer and other layers of the smart phone 1900. The memory 1902 includes an RAM and an ROM, and stores programs executed by the processor 1901, and data. The storage device 1903 may include a storage medium, such as a semiconductor memory and a hard disk. The external connection interface 1904 is an interface for connecting an external device (such as a memory card or a universal serial bus (USB) device) to the smart phone 1900.

The camera device 1906 includes an image sensor (such as a charge coupled device (CCD) and a complementary metal oxide semiconductor (CMOS)) and generates a captured image. The sensor 1907 may include a set of sensors, such as a measurement sensor, a gyroscope sensor, a geomagnetic sensor and an acceleration sensor. The microphone 1908 converts sound inputted into the smart phone 1900 into an audio signal. The input device 1909 includes, for example, a touch sensor configured to detect touch on a screen of the display device 1910, a keypad, a keyboard, a button or a switch, and receives an operation or information inputted by a user equipment. The display device 1910 includes a screen (such as a liquid crystal display (LCD) and an organic light emitting diode (OLED)), and displays an output image from the smart phone 1900. The speaker 1911 converts an audio signal that is output from the smart phone 1900 to sound.

The wireless communication interface 1912 supports any cellular communication schemes (such as LET and LTE-Advanced), and performs wireless communication. The wireless communication interface 1212 may generally include, for example, a BB processor 1913 and an RF circuit 1914. The BB processor 1913 may perform, for example, encoding/decoding, modulating demodulating, and multiplexing/demultiplexing, and performs various types of signal processing for wireless communication. In addition, the RF circuit 1914 may include, for example, a frequency mixer, a filter and an amplifier, and transmits and receives a radio signal via the antenna 1916. The wireless communication interface 1912 may be one chip module on which the BB processor 1913 and the RF circuit 1914 are integrated. The wireless communication interface 1912 may include multiple BB processors 1913 and multiple RF circuits 1914, as shown in FIG. 19. Although FIG. 19 shows an example in which the wireless communication interface 1912 includes the multiple BB processors 1913 and the multiple RF circuits 1914, the wireless communication interface 1912 may also include a single BB processor 1913 or a single RF circuit 1914.

Furthermore, in addition to a cellular communication scheme, the wireless communication interface 1912 may support another type of wireless communication scheme such as a short-distance wireless communication scheme, a near field communication scheme, and a w ireless local area network (LAN) scheme. In this case, the wireless communication interface 1912 may include the BB processor 1913 and the RF circuit 1914 for each wireless communication scheme.

Each of the antenna switches 1915 switches connection destinations of the antennas 1916 among multiple circuits (such as circuits for different wireless communication schemes) included in the wireless communication interface 1912.

Each of the antennas 1916 includes a single antenna element or multiple antenna elements (such as multiple antenna elements included in an MIMO antenna), and is used for transmitting and receiving a radio signal by the wireless communication interface 1912. The smart phone 1900 may include multiple antennas 1916, as shown in FIG. 19. Although FIG. 19 shows an example in which the smart phone 1900 includes multiple antennas 1916, the smart phone 1900 may also include a single antenna 1916.

Furthermore, the smart phone 1900 may include the antenna 1916 for each wireless communication scheme. In this case, the antenna switch 1915 may be omitted from of the configuration of the smart phone 1900.

The bus 1917 connects the processor 1901, the memory 1902, the storage device 1903, the external connection interface 1904, the camera device 1906, the sensor 1907, the microphone 1908, the input device 1909, the display device 1910, the speaker 1911, the wireless communication interface 1912, and the auxiliary controller 1919 to each other. The battery 1918 supplies power to each block of the smart phone 1900 shown in FIG. 19 via feeder lines, which are partially shown as dashed lines in the figure. The auxiliary controller 1919 operates a minimum necessary function of the smart phone 1900, for example, in a sleep mode.

In the smart phone 1900 shown in FIG. 19, the determining unit 620, the selecting unit 630, the encoding unit 640, the storing unit 650 and the establishing unit 660 described with reference to FIG. 6 may be implemented by the processor 1901 or the auxiliary controller 1919, and the communication unit 610 described with reference to FIG. 6 may be implemented by the wireless communication interface 1912. At least a pan of functions may also be implemented by the processor 1901 or the auxiliary controller 1919. For example, the processor 1901 or the auxiliary controller 1919 may perform a function of determining a received beam by executing instructions stored in the memory 1902 or the storage device 1903.

(Second Application Example)

Figure 20:
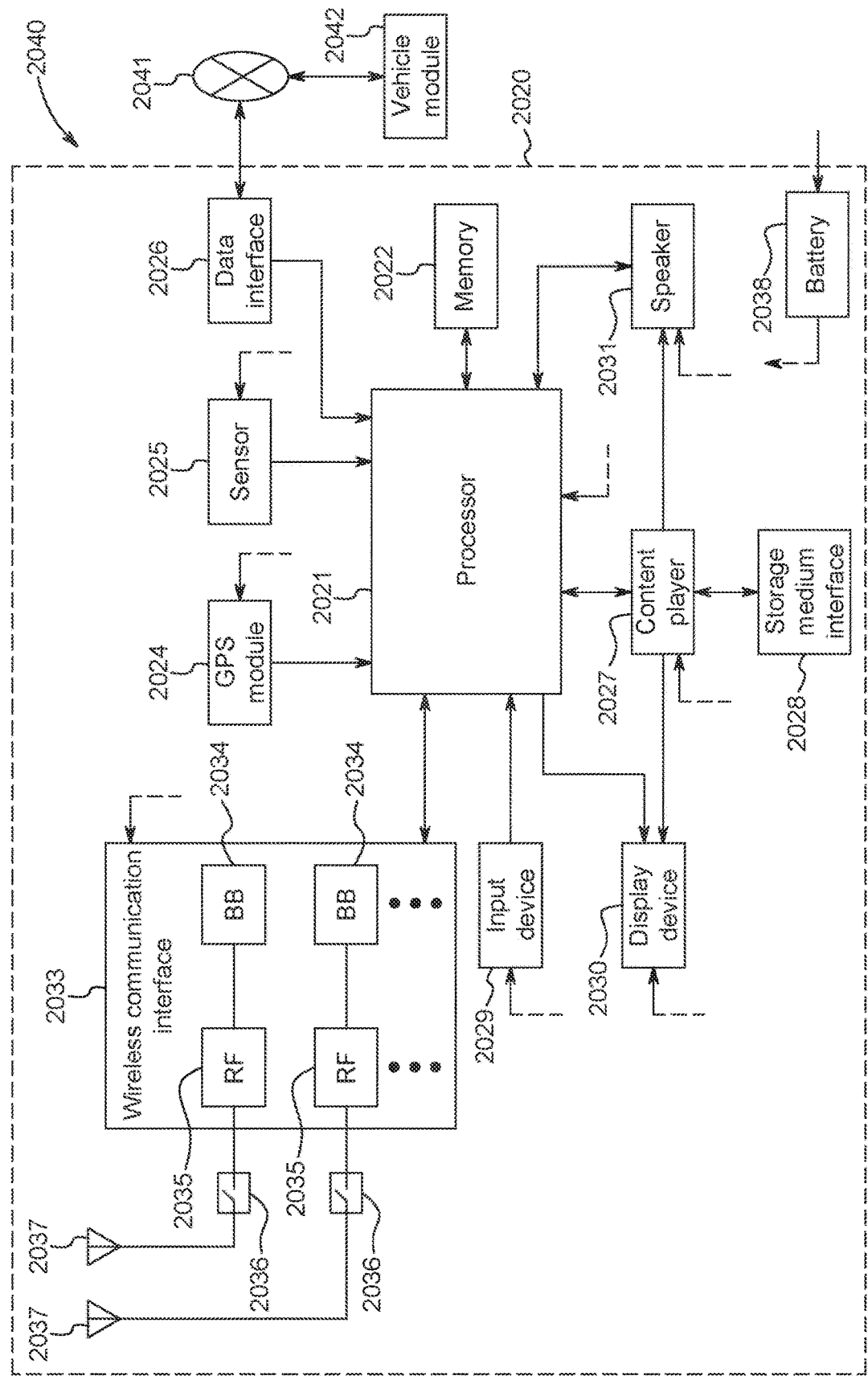
FIG. 20 is a block diagram showing an example of a schematic configuration of a vehicle navigation device.

FIG. 20 is a block diagram showing an example of a schematic configuration of a vehicle navigation device 2020 to which the technology of the present disclosure may be applied. The vehicle navigation device 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a wireless communication interface 2033, one or more antenna switches 2036, one or more antennas 2037 and a battery 2038.

The processor 2021 may be, for example, a CPU or a SoC, and controls the navigation function and additional functions of the vehicle navigation device 2020. The memory 2022 includes an RAM and an ROM, and stores programs executed by the processor 2021, and data.

The GPS module 2024 measures a location of the vehicle navigation device 2020 (such as a latitude, a longitude and a height) using a GPS signal received from a GPS satellite. The sensor 2025 may include a group of sensors such as a gyroscope sensor, a geomagnetic sensor and an air pressure sensor. The data interface 2026 is connected to, for example, an in-vehicle network 2041 via a terminal that is not shown, and acquires data (such as vehicle speed data) generated by the vehicle.

The content player 2027 reproduces contents stored in a storage medium (such as a CD and a DVD) which is inserted into the storage medium interface 2028. The input device 2029 includes, for example, a touch sensor configured to detect touch on a screen of the display device 2030, a button, or a switch, and receives an operation or information inputted by a user equipment. The display device 2030 includes a screen such as a LCD or an OLED display, and displays an image of the navigation function or content that is reproduced. The speaker 2031 outputs a sound of a navigation function or the reproduced content.

The wireless communication interface 2033 supports any cellular communication schemes (such as LTE and LTE-advanced) and performs wireless communication. The wireless communication interface 2033 may generally include, for example, a BB processor 2034 and an RF circuit 2035. The BB processor 2034 may perform, for example, coding/decoding, modulation/demodulation and multiplexing de-multiplexing, and perform various types of signal processing for wireless communications. In addition, the RF circuit 2035 may include, for example, a frequency mixer, a filter and an amplifier, and transmits and receives a radio signal via the antenna 2037. The wireless communication interface 2033 may be one chip module on which the BB processor 2034 and the RF circuit 2035 are integrated. As shown in FIG. 20, the wireless communication interface 2033 may include multiple BB processors 2034 and multiple RF circuits 2035. Although FIG. 20 shows an example in which the wireless communication interface 2033 includes the multiple BB processors 2034 and the multiple RF circuits 2035, the wireless communication interface 2033 may also include a single BB processor 2034 or a single RF circuit 2035.

Furthermore, in addition to a cellular communication scheme, the wireless communication interface 2033 may support another type of wireless communication scheme, such as a short-distance wireless communication scheme, a near field communication scheme and a wireless LAN scheme. In this case, the wireless communication interface 2033 may include a BB processor 2034 and an RF circuit 2035 for each wireless communication scheme.

Each of the antenna switches 2036 switches connection destinations of the antennas 2037 among multiple circuits (such as circuits for different wireless communication schemes) included in the wireless communication interface 2033.

Each of the antennas 2037 includes a single antenna element or multiple antenna elements (such as multiple antenna elements included in a MIMO antenna) and is used for transmitting and receiving a radio signal by the wireless communication interface 2033. As shown in FIG. 20, the vehicle navigation device 2020 may include multiple antennas 2037. Although FIG. 20 shows an example in which the vehicle navigation device 2020 includes multiple antennas 2037, the vehicle navigation device 2020 may also include a single antenna 2037.

Furthermore, the vehicle navigation device 2020 may include die antenna 2037 for each wireless communication scheme. In this case, the antenna swatch 2036 may be omitted from the configuration of the vehicle navigation device 2020.

The battery 2038 supplies power to each block of the vehicle navigation device 2020 shown in FIG. 20 via feeder lines, which are partially shown as dashed lines in the figure. The battery 2038 accumulates the power supplied from the vehicle.

In the vehicle navigation device 2020 shown in FIG. 20, the determining unit 620, the selecting unit 630, the encoding unit 640, the storing unit 650 and the establishing unit 660 described with reference to FIG. 6 may be implemented by the processor 2021, and the communication unit 610 described with reference to FIG. 6 may be implemented by the wireless communication interface 2033. At least a part of functions may also be implemented by the processor 2021. For example, the processor 2021 may perform a function of determining a received beam by executing instructions stored in the memory 2022.

The technology of the present disclosure may also be implemented as an in-vehicle system (or a vehicle) 2040 including the vehicle navigation device 2020, an in-vehicle network 2041 and one or more blocks of a vehicle module 2042. The vehicle module 2042 generates vehicle data (such as vehicle speed, motor speed and fault information), and outputs the generated data to the in-vehicle network 2041.

The preferred embodiments of the present disclosure have been described above with reference to the drawings, but the present disclosure is not limited to the above examples. Those skilled in the an can make various changes and modifications within die scope of the appended claims, and it should be understood that such changes and modifications naturally fall within the technical scope of the present disclosure.

For example, units shown by dashed boxes in functional block diagrams shown in the drawings indicate that the functional units are optional in the respective devices, and the various optional functional units may be combined in an appropriate manner to implement the required features.

For example, multiple functions included in a unit in the above embodiments may be implemented by separate devices. Alternatively, multiple functions implemented by multiple units in the above embodiments may be implemented by separate devices, respectively. In addition, one of the above functions may be implemented by multiple units. Needless to say, such configuration is included in the technical scope of the present disclosure.

In the specification, steps described in the flowchart include not only the processing performed chronologically, but also the processing performed in parallel or individually rather than chronologically. Furthermore, even in the step of processing in lime series, the order can be appropriately changed.

In addition, according to the present disclosure, the following configuration can be performed.

(1) An electronic equipment including a processing circuit configured to:
  receive, from a user equipment, information about N candidate transmitted beams, where N is an integer greater than 1;
  select, from the N candidate transmitted beams, a transmitted beam for transmitting downlink information to the user equipment; and
  determine a Transmission Configuration Indication TCI state according to the selected transmitted beam, and transmit the TCI state to the user equipment.

(2) The electronic equipment according to item (1), where the processing circuit is further configured to:
   determine identification information of the N candidate transmitted beams according to the information about the N candidate transmitted beams.
(3) The electronic equipment according to item (2), where the processing circuit is further configured to:
   determine order information of the N candidate transmitted beams according to the information about the N candidate transmitted beams; and
   select a transmitted beam for transmitting downlink information to die user equipment according to the order information of the N candidate transmitted beams.
(4) The electronic equipment according to item (2), where die processing circuit is further configured to:
   determine channel quality information between all or a part of candidate transmitted beams in the N candidate transmitted beams and the user equipment according to the information about the N candidate transmitted beams; and
   select a transmitted beam for transmitting downlink information to the user equipment according to the channel quality information between the all or a part of candidate transmitted beams and the user equipment.
(5) The electronic equipment according to item (1), where the processing circuit is further configured to:
   determine a beam for transmitting a Synchronization Signal Block SSB corresponding to the selected transmitted beam; and
   determine a TCI state to be transmitted to the user equipment according to a mapping relation between the TCI state and the beam for transmitting the SSB.
(6) The electronic equipment according to item (5), where a radiation range of the selected transmitted beam is within a radiation range of the beam for transmitting the SSB corresponding to the selected transmitted beam.
(7) The electronic equipment according to item (5), where the processing circuit is further configured to:
   after an initial access is completed, establish a mapping relation between the TCI state and the beam for transmitting the SSB; and
   transmit, to the user equipment, the mapping relation between the TCI state and the beam for transmitting the SSB.
(8) The electronic equipment according to item (1), where the processing circuit is further configured to:
   periodically receive, from the user equipment, the information about the N candidate transmitted beams, or
   send a request to the user equipment to obtain the information about the N candidate transmitted beams.
(9) The electronic equipment according to any one of items (1) to (8), where the electronic equipment includes a network side device in a New Radio NR communication system.
(10) An electronic equipment including a processing circuit configured to:
   receive, from a network side device, a Transmission Configuration Indication TCI state; and
   determine a received beam for receiving downlink information from the network side device according to the TCI state.
(11) The electronic equipment according to item (10), where the processing circuit is further configured to:
   transmit, to the network side device, information about N candidate transmitted beams for selecting, by the network side device, a transmitted beam for transmitting downlink information to the electronic equipment from the N candidate transmitted beams, and determine the TCI state according to the selected transmitted beam, where N is an integer greater than 1.
(12) The electronic equipment according to item (10), where the processing circuit is further configured to:
   determine the N candidate transmitted beams according to channel quality between K transmitted beams of the network side device and the electronic equipment, where K is an integer greater than or equal to N.
(13) The electronic equipment according to item (12), where the processing circuit is further configured to:
   determine the channel quality according to one or more of parameters including Reference Signal Receiving Power RSRP, Reference Signal Receiving Quality RSRQ, and Block Error Rate BLER.
(14) The electronic equipment according to item (11), where the processing circuit is further configured to:
   periodically transmit the information about the N candidate transmitted beams to the network side device; or
   transmit the information about the N candidate transmitted beams in response to a request of the network side device.
(15) The electronic equipment according to item (11), where the information about the N candidate transmitted beams includes identification information of the N candidate transmitted beams.
(16) The electronic equipment according to item (15), where the processing circuit is further configured to express identification of the N candidate transmitted beams in any means of:
   expressing the identification of each of the N candidate transmitted beams by using binary coding;
   expressing the identification of the N candidate transmitted beams by using a bit map;
   expressing the identification of a reference candidate transmitted beam in the N candidate transmitted beams by using the binary coding, and expressing the identification of other candidate transmitted beams in addition to the reference candidate transmitted beam in the N candidate transmitted beams by using binary coding of a difference value between identifications of other candidate transmitted beams and the reference candidate transmitted beam; and
   according to a first mapping table and an unordered combination of the N candidate transmitted beams, determining combination identification corresponding to the combination, and expressing the identification of the N candidate transmitted beams by using the combination identification, wherein the first mapping table stores a mapping relation between the combination of the N candidate transmitted beams selected from the K transmuted beams of the network side device and the combination identification, wherein K is an integer greater than or equal to N.
(17) The electronic equipment according to item (15), where the information about the N candidate transmitted beams includes order information of the N candidate transmitted beams.

(18) The electronic equipment according to item (17), where the processing circuit is further configured to:
according to a second mapping table and an ordered arrangement of the N candidate transmitted beams, determine arrangement identification corresponding to the arrangement; and
express identification and order of the N candidate transmitted beams by using the arrangement identification,
where the second mapping table stores a mapping relation between the arrangement of the N candidate transmitted beams selected from the K transmitted beams of the network side device and the arrangement identification, where K is an integer greater than or equal to N.

(19) The electronic equipment according to item (15), where the information about the N candidate transmitted beams includes channel quality information between all or a part of candidate transmitted beams in the N candidate transmitted beams and the electronic equipment.

(20) The electronic equipment according to item (10), where the processing circuit is further configured to:
determine, according to a mapping relation between the TCI state and a beam for transmitting a Synchronization Signal Block SSB, a beam for transmitting the SSB; and
determine a received beam for receiving downlink information from the network side device according to a mapping relation between the beam for transmitting the SSB and the received beam.

(21) The electronic equipment according to item (20), where the processing circuit is further configured to:
after an initial access is completed, receive from the network side device the mapping relation between the TCI state and the beam for transmitting the SSB.

(22) The electronic equipment according to item (20), where the processing circuit is further configured to:
establish, in the process of initial access, the mapping relation between the beam for transmitting the SSB and the received beam.

(23) The electronic equipment according to item (11), where the processing circuit is further configured to:
receive, from the network side device, configuration information about a number of the N candidate transmitted beams.

(24) The electronic equipment according to any one of items (10) to (23), where the electronic equipment includes user equipment in a New Radio NR communication system.

(25) A wireless communication method, including:
receiving, from a user equipment, information about N candidate transmitted beams, where N is an integer greater than 1;
selecting, from the N candidate transmitted beams, a transmitted beam for transmitting downlink information to the user equipment; and
determining a Transmission Configuration Indication TCI state according to the selected transmitted beam, and transmitting the TCI state to the user equipment.

(26) A wireless communication method, including:
receiving, from a network side device, a Transmission Configuration Indication TCI state; and
determining a received beam for receiving downlink information from the network side device according to the TCI state.

(27) A computer-readable storage medium including computer-executable instructions which, when executed by a computer, cause the computer to perform the wireless communication method according to items (25) or (26).

Although the embodiments of the present disclosure have been described above in detail in conjunction with the drawings, it should be understood that the embodiments described above are merely illustrative but not limitative of the present disclosure. Those skilled in the an can make various modifications and changes to the above embodiments without departing from the spirit and scope of the present disclosure. Therefore, the scope of the present disclosure is defined only by the appended claims and their equivalents.

The invention claimed is:

1. An electronic equipment comprising a processing circuit configured to:
receive plural base station transmission beams;
measure K base station transmission beams of the plural base station transmission beams,
wherein K is an integer greater than 1;
report, to a base station, identifications of Channel State Information-Reference Signal (CSI-RS) resources corresponding to N candidate base station transmission beams selected by the electronic equipment from the measured K base station transmission beams;
wherein N is an integer greater than 1 and less than or equal to K,
wherein N and K are predetermined values that correspond to a reporting mode used by the electronic equipment, the reporting mode being set in advance by the base station;
receive, from the base station, Downlink Control Information (DCI) having an indication of a transmission configuration indication (TCI) state;
wherein the TCI state is determined by the base station and represents that there is a quasi co-location (QCL) relation between:
downlink information to be transmitted by the base station to the electronic equipment, and
a Synchronization Signal Block (SSB) signal that has been previously transmitted to the electronic equipment by the base station via one of the N candidate base station transmission beams,
wherein the one of the N candidate base station transmission beams is determined by the base station based on the reported identifications of Channel State Information-Reference Signal (CSI-RS) resources corresponding to the N candidate base station transmission beams; and
receive the downlink information via a user equipment reception beam that was used to receive the SSB signal corresponding to the TCI state.

2. The electronic equipment according to claim 1, wherein the SSB signal is received by the electronic equipment from the base station via a SSB base station transmission beam determined by the base station, and at least one of the N candidate base station transmission beams is within a radiation range of the SSB base station transmission beam.

3. The electronic equipment according to claim 1, wherein the processing circuit is further configured to receive the SSB signal from the base station prior to measuring the K base station transmission beams.

4. A method performed by an electronic equipment comprising a processing circuit, the method comprising:
- receiving plural base station transmission beams;
- measuring K base station transmission beams of the plural base station transmission beams,
- wherein K is an integer greater than 1;
- reporting, to a base station, identifications of Channel State Information-Reference Signal (CSI-RS) resources corresponding to N candidate base station transmission beams selected by the electronic equipment from the measured K base station transmission beams,
- wherein N is an integer greater than 1 and less than or equal to K,
- wherein N and K are predetermined values that correspond to a reporting mode used by the electronic equipment, the reporting mode being set in advance by the base station;
- receiving, from the base station, Downlink Control Information (DCI) having an indication of a transmission configuration indication (TCI) state;
- wherein the TCI state is determined by the base station and represents that there is a quasi co-location (QCL) relation between:
  - downlink information to be transmitted by the base station to the electronic equipment, and
  - a Synchronization Signal Block (SSB) signal that has been previously transmitted to the electronic equipment by the base station via one of the N candidate base station transmission beams,
- wherein the one of the N candidate base station transmission beams is determined by the base station based on the reported identifications of Channel State Information-Reference Signal (CSI-RS) resources corresponding to the N candidate base station transmission beams; and
- receiving the downlink information via a user equipment reception beam that was used to receive the SSB signal corresponding to the TCI state.

5. The method according to claim 4, wherein the SSB signal is received by the electronic equipment from the base station via a SSB base station transmission beam determined by the base station, and at least one of the N candidate base station transmission beams is within a radiation range of the SSB base station transmission beam.

6. The method according to claim 4, further comprising:
- receiving the SSB signal from the base station prior to measuring the K base station transmission beams.

7. A non-transitory computer readable product containing instructions to cause a processing circuit of an electronic equipment to perform a method, the method comprising:
- receiving plural base station transmission beams;
- measuring K base station transmission beams of the plural base station transmission beams,
- wherein K is an integer greater than 1;
- reporting, to a base station, identifications of Channel State Information-Reference Signal (CSI-RS) resources corresponding to N candidate base station transmission beams selected by the electronic equipment from the measured K base station transmission beams;
- wherein N is an integer greater than 1 and less than or equal to K,
- wherein N and K are predetermined values that correspond to a reporting mode used by the electronic equipment the reporting mode being set in advance by the base station;
- receiving, from the base station, Downlink Control Information (DCI) having an indication of a transmission configuration indication (TCI) state;
- wherein the TCI state is determined by the base station and represents that there is a quasi co-location (QCL) relation between:
  - downlink information to be transmitted by the base station to the electronic equipment, and
  - a Synchronization Signal Block (SSB) signal that has been previously transmitted to the electronic equipment by the base station via one of the N candidate base station transmission beams,
- wherein the one of the N candidate base station transmission beams is determined by the base station based on the reported identifications of Channel State Information-Reference Signal (CSI-RS) resources corresponding to the N candidate base station transmission beams; and
- receiving the downlink information via a user equipment reception beam that was used to receive the SSB signal.

* * * * *